United States Patent
Xu et al.

(10) Patent No.: US 10,951,289 B2
(45) Date of Patent: Mar. 16, 2021

(54) ELECTRONIC DEVICE, METHOD APPLIED TO ELECTRONIC DEVICE, AND DATA PROCESSING DEVICE FOR REUSING IDLE CSI-RS PORTS OF AN ADJACENT CELL

(71) Applicant: SONY CORPORATION, Tokyo (JP)

(72) Inventors: Jin Xu, Beijing (CN); Cheng Gao, Beijing (CN); Siqi Liu, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 103 days.

(21) Appl. No.: 16/066,390

(22) PCT Filed: Mar. 22, 2017

(86) PCT No.: PCT/CN2017/077632
§ 371 (c)(1),
(2) Date: Jun. 27, 2018

(87) PCT Pub. No.: WO2017/167082
PCT Pub. Date: Oct. 5, 2017

(65) Prior Publication Data
US 2019/0020395 A1    Jan. 17, 2019

(30) Foreign Application Priority Data
Apr. 1, 2016 (CN) .......................... 201610204474.7

(51) Int. Cl.
*H04B 7/06* (2006.01)
*H04W 72/04* (2009.01)
(Continued)

(52) U.S. Cl.
CPC ......... *H04B 7/0626* (2013.01); *H04B 7/0617* (2013.01); *H04B 7/0695* (2013.01);
(Continued)

(58) Field of Classification Search
USPC ......................................................... 370/252
See application file for complete search history.

(56) References Cited

U.S. PATENT DOCUMENTS

| | | |
|---|---|---|
| 8,897,182 B2 | 11/2014 | Yoon et al. |
| 9,088,396 B2 | 7/2015 | Yoon et al. |

(Continued)

FOREIGN PATENT DOCUMENTS

| | | |
|---|---|---|
| CN | 102647751 A | 8/2012 |
| CN | 103155456 A | 6/2013 |
| WO | WO 2014/051374 A1 | 4/2014 |

OTHER PUBLICATIONS

Extended European Search Report dated Mar. 6, 2019 in corresponding European Application No. 17773112.2, 8 pages.

(Continued)

*Primary Examiner* — Alpus Hsu
*Assistant Examiner* — Hooman Houshmand
(74) *Attorney, Agent, or Firm* — Xsensus LLP

(57) ABSTRACT

An electronic device, a method applied to an electronic device, and a data processing device. The electronic device includes: a processing circuit configured to allow a cell to implement data transmission by using at least a portion of a time resource corresponding to an unused channel state information reference signal (CSI-RS) port, wherein the CSI-RS port is from a CSR-RS configuration different from a CSI-RS configuration of the cell.

9 Claims, 18 Drawing Sheets

(51) Int. Cl.
 *H04L 5/00* (2006.01)
 *H04L 25/02* (2006.01)
 *H04W 24/10* (2009.01)

(52) U.S. Cl.
 CPC ........ *H04L 5/0048* (2013.01); *H04L 25/0224* (2013.01); *H04W 24/10* (2013.01); *H04W 72/04* (2013.01); *H04L 5/0044* (2013.01)

(56) References Cited

U.S. PATENT DOCUMENTS

| | | | |
|---|---|---|---|
| 9,369,251 B2 | 6/2016 | Yoon et al. | |
| 2013/0136100 A1* | 5/2013 | Yoon | H04W 72/0446 370/330 |
| 2013/0322273 A1* | 12/2013 | Etemad | H04W 24/10 370/252 |
| 2013/0322288 A1* | 12/2013 | Zhang | H04B 7/024 370/252 |
| 2013/0344909 A1* | 12/2013 | Davydov | H04W 24/02 455/501 |
| 2015/0257132 A1 | 9/2015 | Park et al. | |
| 2016/0234878 A1* | 8/2016 | Svedman | H04W 68/005 |
| 2016/0294527 A1 | 10/2016 | Yoon et al. | |
| 2019/0158155 A1* | 5/2019 | Park | H04B 7/04 |

OTHER PUBLICATIONS

LG Electronics, "Beamformed CSI-RS Related Enhancements Based on the Identified Approaches", 3GPP TSG RAN WG1 Meeting #82; R1-154274, 3rd Generation Partnership Project, Beijing, China Aug. 24-28, 2015, 7 pages.

International Search Report dated Jun. 7, 2017 in PCT/CN2017/077632 filed Mar. 22, 2017.

* cited by examiner

ELECTRONIC DEVICE, METHOD APPLIED TO ELECTRONIC DEVICE, AND DATA PROCESSING DEVICE FOR REUSING IDLE CSI-RS PORTS OF AN ADJACENT CELL

The present application claims the priority to Chinese Patent Application No. 201610204474.7, entitled "ELECTRONIC DEVICE, METHOD APPLIED TO ELECTRONIC DEVICE, AND DATA PROCESSING DEVICE", filed with the Chinese State Intellectual Property Office on Apr. 1, 2016, the entire disclosure of which is incorporated herein by reference.

FIELD OF THE INVENTION

The embodiments of the present disclosure generally relates to the field of wireless communications, and in particular to three-dimensional multiple-input multiple-output (3D MIMO) technology, and more particularly to an electronic device using beam-forming channel state information-reference signal (CSI-RS) technology, and a method for the electronic device, and an information processing device.

BACKGROUND OF THE INVENTION

Generally, adjacent cells use different channel state information-reference signal (CSI-RS) configurations, and time-frequency resources corresponding to the CSI-RSs of adjacent cells have different positions to avoid CSI-RS interference.

In 3D MIMO technology, one or more antenna ports are given different weights to generate a beam in a three-dimensional direction, called beam-forming. Beam-formed CSI-RS is different from non-coded CSI-RS. In the non-coded CSI-RS scheme, all user equipments use all common CSI-RS ports. However, the beam-formed CSI-RS may allocate one or more CSI-RS ports for a user equipment (that is, UE-Specific, UE-specific beam-forming) or a beam (that is, Cell-Specific, cell-specific beam-forming).

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

An electronic device is provided according to an aspect of the present application, which includes: processing circuitry, configured to allow a cell to use at least a part of time-frequency resources corresponding to idle channel state information-reference signal (CSI-RS) ports of a CSI-RS configuration different from a CSI-RS configuration of the cell itself to transmit data.

An information processing device is provided according to another aspect of the present application, which includes: an antenna, configured to receive, from a base station of an adjacent cell of a cell, information containing usage status of CSI-RS ports of the adjacent cell; and processing circuitry, configured to: determine, based on the information received by the antenna, the usage status of the CSI-RS ports of the adjacent cell, and determine, based on the usage status of the ports, time-frequency resources corresponding to idle CSI-RS ports of each CSI-RS configuration; and allow the cell to use at least a part of the time-frequency resources corresponding to the idle CSI-RS ports of a channel state information-reference signal (CSI-RS) configuration different from a CSI-RS configuration of the cell to transmit data.

An electronic device is provided according to another aspect of the present application, which includes: processing circuitry, configured to: determine, based on a message received from a base station, time-frequency resources corresponding to idle CSI-RS ports of a CSI-RS configuration different from a CSI-RS configuration used by the base station itself, which can be used by a user equipment to transmit data; and generate a message containing a user equipment feedback.

An information processing device is further provided according to another aspect of the present application, which includes: an antenna, configured to receive a message from a base station; and processing circuitry, configured to: determine, based on the message received by the antenna, time-frequency resources corresponding to idle CSI-RS ports of a CSI-RS configuration different from a CSI-RS configuration used by the base station, which can be used by a user equipment to transmit data; and generate a message containing a user equipment feedback. The antenna is further configured to transmit the message containing the user equipment feedback to the base station.

An electronic device is further provided according to another aspect of the present application, which includes: a memory, configured to store usage status of CSI-RS ports of each cell; and processing circuitry, configured to determine, for each cell, usage status of CSI-RS ports of an adjacent cell of the cell.

A method for an electronic device is further provided according to another aspect of the present application, which includes: allowing a cell to use at least a part of time-frequency resources corresponding to idle channel state information-reference signal (CSI-RS) ports of a CSI-RS configuration different from a CSI-RS configuration of the cell itself to transmit data.

A method for an electronic device is further provided according to another aspect of the present application, which includes: determining, based on a message received from a base station, time-frequency resources corresponding to idle CSI-RS ports of a CSI-RS configuration different from a CSI-RS configuration used by the base station itself, which can be used by a user equipment to transmit data; and generating a message containing a user equipment feedback.

A method for an electronic device is further provided according to another aspect of the present application, which includes: storing usage status of CSI-RS ports of each cell; and determining, for each cell, usage status of CSI-RS ports of an adjacent cell of the cell.

According to other aspects of the present disclosure, there are also provided computer program codes and computer program products for implementing the above mentioned methods for electronic device and a computer readable storage medium in which computer program codes for implementing the above methods for electronic device are recorded.

In an embodiment of the present application, the time-frequency resources corresponding to the idle CST-RS ports of other CST-RS configurations are used to transmit data, thereby fully utilizing the idle resource of CSI-RS, and resource utilization efficiency is improved without causing significant CSI-RS interference.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1A:
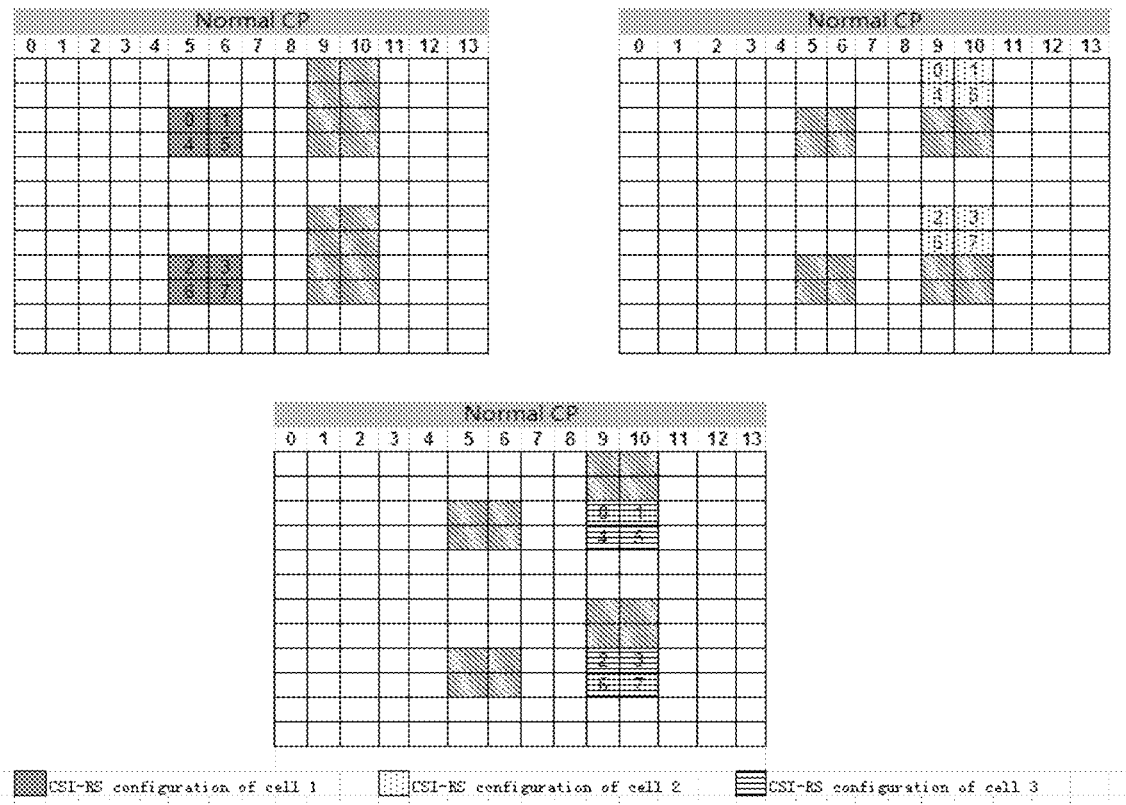
FIG. 1a illustrates a schematic diagram of CSI-RS configurations of adjacent cells.

FIG. 1a illustrates a schematic diagram of time-frequency resource allocation of CSI-RS configurations of adjacent cell 1, cell 2 and cell 3. Herein, the CSI-RS configuration may refer to a position of the time-frequency resource allocated for the CSI-RS. In FIG. 1a, CSI-RS configuration of each cell includes 8 ports (which are indicated by sequence numbers of 0 to 7), and each port corresponds to one time-frequency resource element. That is, each CSI-RS configuration in FIG. 1a corresponds to eight time-frequency resource elements (RE), and the number on each RE represents a sequence number of a corresponding CSI-RS port. It should be noted that, the sequence number here is merely representative number rather than actual port number. For example, in actual eight-port CSI-RS configuration, the ports in use are ports 15 to 22. Specifically, the ports of the CSI-RS configuration of the cell 1 correspond to REs filled with a grey color, the ports of the CSI-RS configuration of the cell 2 correspond to REs filled with black points, and the ports of the CSI-RS configuration of the cell 3 correspond to REs filled with horizontal lines. Each cell does not transmit any information on the REs corresponding to CST-RS configurations of other cells, and a corresponding block filled with oblique lines is used to indicate this.

The cell will not use all the CSI-RS ports in the CSI-RS configuration all the time in a case that the cell uses the beam-formed CSI-RS scheme. In other words, the time-frequency resources corresponding to certain CSI-RS ports are idle, which results in serious waste of resource. Taking the Cell-Specific beam-forming as an example, the number of active beams in a sub-frame is generally less than the number of the configured beams. The waste of the resource will be more serious in a case that non-periodic CSI-RS is used in the configuration. It is noted that, in the specification, the cell may be a macro cell and a small cell unless otherwise specified, and the cell is also referred to as a base station where appreciate. Further, in the specification, the time-frequency resources corresponding to the CSI-RS ports are referred to as CSI-RS resources, the CSI-RS ports or resources for simplicity.

Figure 2:
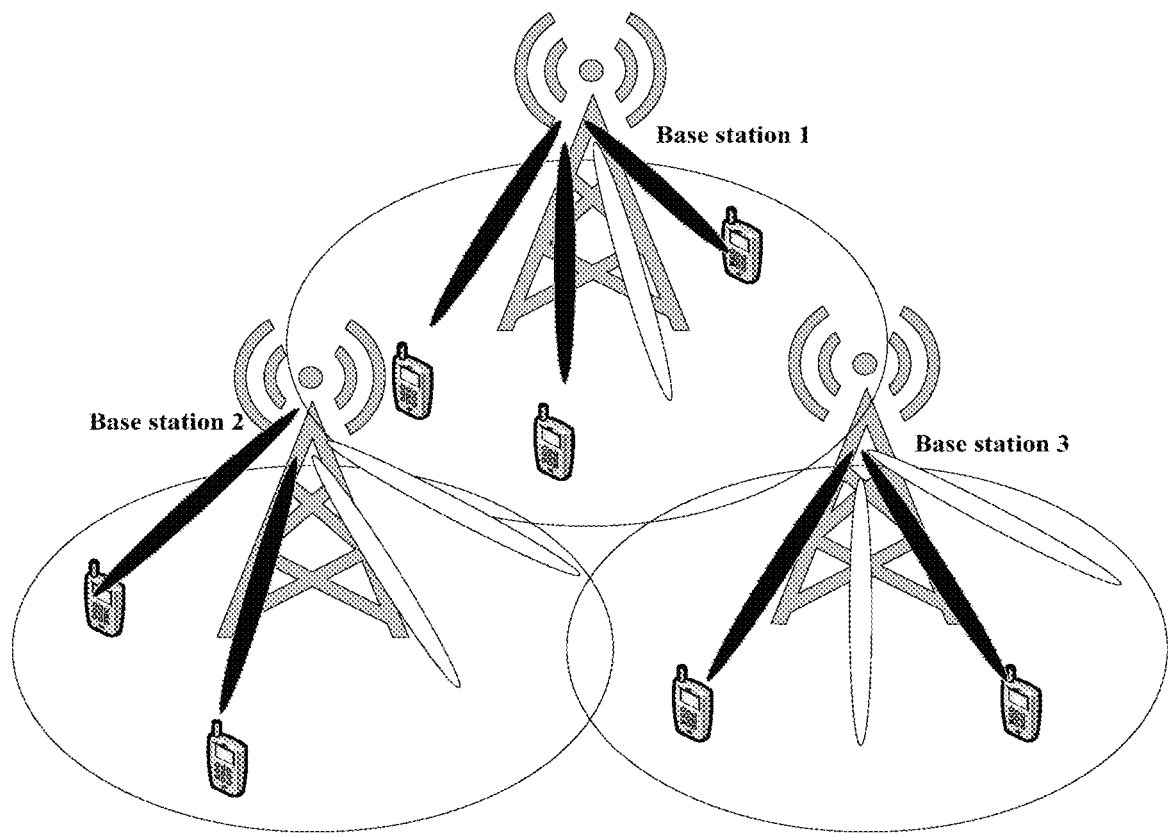
FIG. 2 illustrates a schematic diagram of a waste of resources in a beam-formed CSI-RS scheme.

FIG. 2 shows a schematic diagram of the waste of resource in a beam-formed CSI-RS scheme. Specifically, the base station 1, the base station 2 and the base station 3 use different CSI-RS configurations to avoid inter-cell CSI-RS interference. It is assumed that, one CSI-RS configuration includes eight CSI-RS ports, one beam is formed by two CSI-RS ports, a solid beam indicates a beam in a service state, i.e., an active state, and a hollow beam indicates a beam in an idle state. For example, in the base station 2, there are two beams in the active state and 2 beams in the idle state, and hence, there are four CSI-RS time-frequency resource elements (they are also abbreviated as CSI-RS resources) unused. Similarly, there are four unused CSI-RS resources in the base station 3. The waste of the resource will be more serious in a case that one base station is adjacent to multiple base stations.

It makes sense to use the time-frequency resources of CSI-RS which are unused by the adjacent base station to transmit data in a case that the base station 1 is to serve many user equipments. The idle CSI-RS resources are used to transmit data in the technology according to the present application.

Further, in addition to the time-frequency resources of CSI-RS which are not used by the adjacent base station, the base station 1 may also use the idle time-frequency resources of the CSI-RS of the base station 1 itself. However, it is mainly discussed a case that the base station uses the idle time-frequency resources of the CSI-RS configuration of the adjacent base station hereinafter. It should be understood that this is not limitative and cannot be understood as any provisions or limitations of the present disclosure on whether one base station use the idle time-frequency resources of the CSI-RS configuration of the one base station itself or not.

On the other hand, although adjacent cells (or base stations) use different CSI-RS configurations in the example of FIG. 2, the adjacent cells may also use the same CSI-RS configuration and mitigate or eliminate CSI-RS interference by other technical means, and the application of the technology of the present application is not affected. Since it is not important for the cell to use the idle CSI-RS resources to transmit data that idle CSI-RS resources of which cell are used, the cell only needs to know the position of the idle CSI-RS resource. Moreover, since the CSI-RS configurations have fixed patterns and are of a limited number, idle CSI-RS resources can be identified in the unit of CSI-RS configuration.

Figure 3:
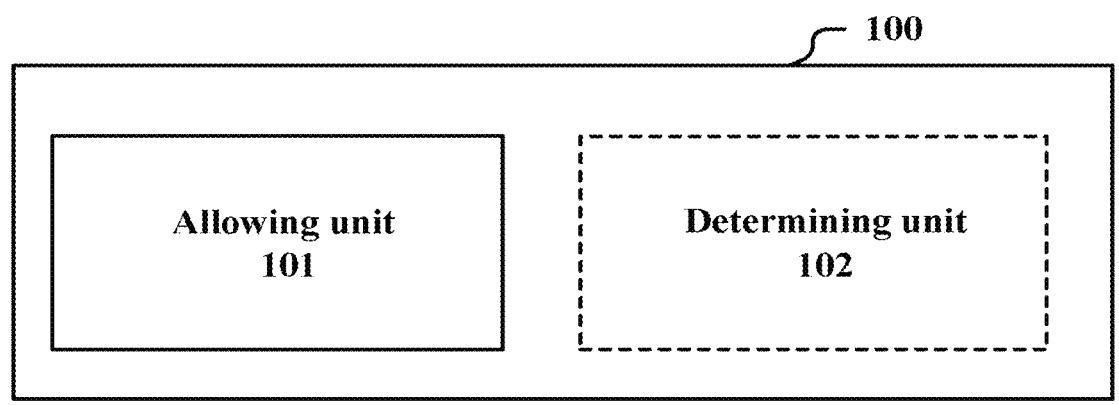
FIG. 3 illustrates a block diagram of functional modules of an electronic device according to an embodiment of the present application.

FIG. 3 illustrates a block diagram of functional modules of an electronic device 100 according to an embodiment of the present application. The electronic device 100 includes: an allowing unit 101 configured to allow a cell to use at least a part of time-frequency resources corresponding to idle CSI-RS ports of a CSI-RS configuration different from a CSI-RS configuration of the cell itself to transmit data. "the cell" for which an operation is performed is also referred to as a current cell hereinafter.

The electronic device 100 may be, for example, located at a base station side of a cell or communicatively coupled to a base station, and the coupling may be in a wired or wireless way.

Since the CST-RS configuration used by a cell is known for the cell, the CSI-RS configurations (hereinafter also referred to as other CSI-RS configurations) different from the CSI-RS configuration of the current cell itself are also known. The time-frequency resources corresponding to idle CSI-RS ports of other CSI-RS configurations may be used by the current cell to transmit data. The current cell may use all the idle CSI-RS resources to transmit data, or may use only a part of the idle CSI-RS resources, depending on actual needs or configurations.

In addition, as mentioned above, the current cell may also use its own idle CSI-RS resources to transmit data. In this case, the allowing unit 101 is configured to allow the current cell to use at least a part of the time-frequency resources corresponding to the idle CSI-RS ports of all the CSI-RS configurations to transmit data.

In another aspect, the use of the idle CSI-RS resources by the cell is not limited to the above manners. For example, the allowing unit 101 may cause the cell to use the above-described time-frequency resources directly. In other words, it may be set that, the cell uses the CSI-RS resources considered as idle by the cell (or predetermined CSI-RS resources) to transmit data (the idle CSI-RS resources herein may include or may not include idle CSI-RS resources of the CSI-RS configuration of the current cell). Subsequently, after obtaining the actual information on the idle CSI-RS resources, the use of the idle CSI-RS resources is adjusted or stopped based on the information. For example, in a case that the CST-RS resources used to transmit data are actually being used, the use of the time-frequency resources to transmit data is stopped.

In an example, the actual information on the idle CSI-RS resources comes from an adjacent cell. As shown in the dotted line block in FIG. 3, the electronic device 100 further includes a determining unit 102 configured to: determine usage status of CSI-RS ports of an adjacent cell of the current cell; and determine the time-frequency resources corresponding to idle CSI-RS ports of each CSI-RS configuration based on the usage status of the ports.

Specifically, the adjacent cell may be a cell located within an interference range of the current cell, or the adjacent cell may be a cell to which the current cell is geographically adjacent. For a cell, if there is no other cell in its interference range, the cell may theoretically use the time-frequency resources corresponding to any CSI-RS configuration different from the CSI-RS configuration of the cell itself to transmit data. However, since there are always other cells in the interference range of the current cell, interference to the CSI-RS transmission of these cells needs to be avoided. That is, the time-frequency resources corresponding to only the idle CSI-RS ports of the CSI-RS configurations of these cells are used to transmit data.

In a wireless communication system, the number of types of CSI-RS configurations is limited. For example, in a case that each CSI-RS configuration includes eight CSI-RS ports, there are five types of CSI-RS configurations. When allocating CSI-RS configurations to each cell, it is generally preferable to allocate different CSI-RS configurations to the adjacent cells as much as possible to avoid CSI-RS interference. Hence, generally, by statistics of the usage status of the CSI-RS ports of all the adjacent cells, idle conditions of the CSI-RS ports of each CSI-RS configuration may be obtained. The idle conditions include, for example, information on which of the CSI-RS ports of the CSI-RS configuration are in an idle state. In an example, for a CSI-RS configuration used by two or more adjacent cells, the number of the time-frequency resources corresponding to the idle CSI-RS ports of the CSI-RS configuration of the adjacent cell with the fewest idle CSI-RS ports is taken as the number of the time-frequency resources corresponding to the idle CSI-RS ports of the CSI-RS configuration. In other words, when the number of the idle CSI-RS ports of a CSI-RS configuration has multiple values in multiple adjacent cells, a minimum value among them is taken as the number of the idle CSI-RS ports of the CSI-RS configuration.

Figure 1B:
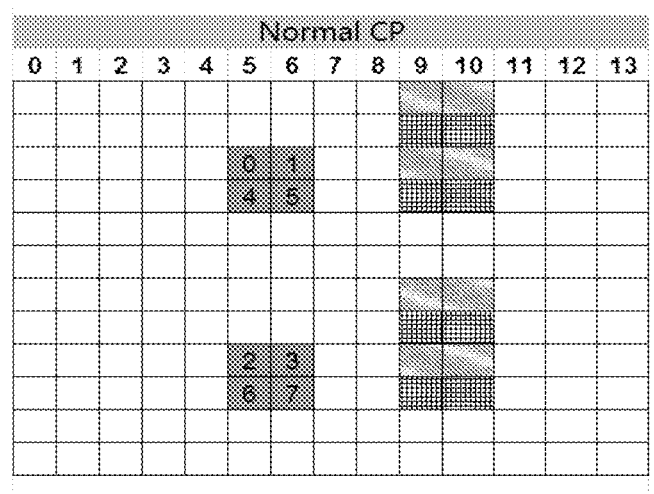
FIG. 1b illustrates a schematic diagram of an example in which idle CSI-RS resources are used to transmit data according to an embodiment of the present application.

Taking the CSI-RS configuration shown in FIG. 1a as an example, in a case that there are many user equipments to be served by the cell 1 and it is expected to use time-frequency resources of CSI-RS that are not used by an adjacent cell to transmit data, the determining unit 102 determines that the CSI-RS ports 4 to 7 of the cell 2 are idle and the CSI-RS ports 4 to 7 of the cell 3 are idle. That is, each of the cells 2 and 3 does not actually use the time-frequency resources corresponding to the CSI-RS ports 4 to 7 of the CSI-RS configuration of the cell to transmit CSI-RS. Hence, the cell 1 may use the time-frequency resources corresponding to the idle CSI-RS ports to transmit data. As shown in FIG. 1b, instead of being filled with oblique lines, these REs may be filled with a grid, indicating that the cell 1 uses the idle CSI-RS resource elements to transmit data. It should be understood that FIG. 1b is only an example, and a similar operation may be performed for other cells. Also, only the OFDM sub-frame of the normal cyclic prefix (CP) are shown in FIGS. 1a and 1b as an example, and the present technology is similarly applicable to the case of using other types of OFDM sub-frame.

In an example, the determining unit 102 may be configured to obtain the usage status of the CSI-RS ports of an adjacent cell based on X2 signaling from a base station of the adjacent cell.

For example, the X2 signaling may be an ENB CONFIGURATION UPDATE message, and the ENB CONFIGURATION UPDATE includes an information element indicating information on the usage status of the CSI-RS ports in the CSI-RS configuration of the adjacent cell. Exemplarily, the information element may be included in an information element Served Cell Information of the ENB CONFIGURATION UPDATE message, for example, a new information element Antenna ports usage is added to the information element.

For example, the information element may be in the form of a bitmap, and the number of bits of the bitmap depends on the number of CSI-RS ports of the CSI-RS configuration. In a case that the CSI-RS configuration has eight CSI-RS ports, the bitmap may have eight bits. A bit of the bitmap being 0 may indicate that the corresponding CSI-RS port is not used, and a bit of the bitmap being 1 may indicate that the corresponding CSI-RS port is being used. Apparently, the opposite definition may also be used.

In another example, the determining unit 102 may obtain the usage status of the CSI-RS ports of the adjacent cell based on the message from the central processing apparatus. In the example, for example, a central processing apparatus is provided to collect the usage status of the CSI-RS ports of the CSI-RS configuration of each cell and provide each cell with the usage status of the CSI-RS ports of the CSI-RS configuration of the adjacent cell of the cell. The central processing apparatus may be communicatively coupled with base stations of the cells in a wired or wireless manner. For example, the central processing apparatus may be located at a core network side or on a server.

Alternatively, the central processing apparatus may perform further processing on the collected usage status of the CSI-RS ports of the CSI-RS configuration of each cell. For example, for a cell, information on the time-frequency resources corresponding to the idle CSI-RS ports of each CSI-RS configuration, or information on the time-frequency resources corresponding to idle CSI-RS ports of the CSI-RS configurations other than the CSI-RS configuration of the cell is obtained, and the information is provided to the cell. In this case, the determining unit 102 may determine the time-frequency resources corresponding to the idle CSI-RS ports of each CSI-RS configuration directly from the message from the central processing apparatus.

In addition, the central processing apparatus may also perform further processing to obtain, for a cell, information on the time-frequency resources corresponding to the idle CSI-RS ports of other CSI-RS configurations (or all the CSI-RS configurations) that can be used by the cell to transmit data, and provide the information to the cell. In this case, the determining unit 102 may determine the time-frequency resources corresponding to the idle CSI-RS ports of the CSI-RS configurations that can be used to transmit data directly from the message from the central processing apparatus.

Each of the units in the electronic device 100 may be implemented, for example, by one or more processing circuitries, and the processing circuitry can be implemented as a chip, for example.

In this embodiment, the electronic device 100 enables the cell to use time-frequency resources corresponding to the idle CSI-RS ports of other CSI-RS configurations to transmit data, thereby improving the resource utilization efficiency of the CSI-RS.

Second Embodiment

As described above, the allowing unit 101 may perform the operation based on the determination result of the determining unit 102, and may also decide whether to continue the previous operation or make the corresponding change to the previous operation based on the determination result of the determining unit 102.

In an example, the allowing unit 101 allows the cell to use time-frequency resources corresponding to the idle CSI-RS ports of other CSI-RS configurations without any judgment. Alternatively, the allowing unit 101 allows or prohibits the use of the time-frequency resources corresponding to the idle CSI-RS ports of other CSI-RS configurations by the cell based on a specific condition, which will be described below with reference to FIG. 4.

Figure 4:
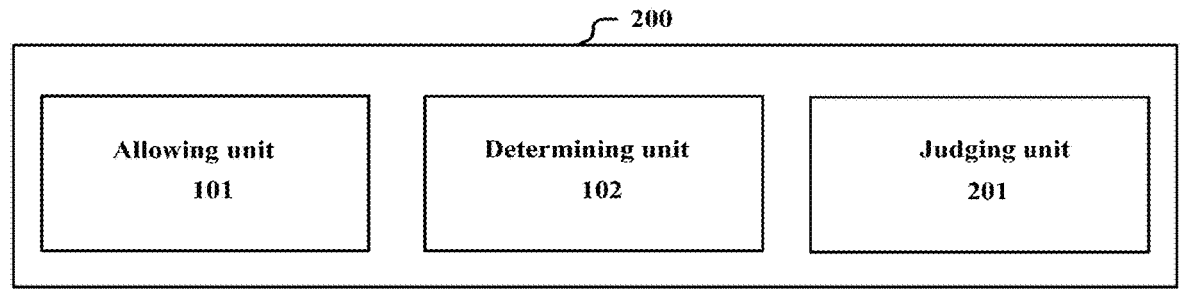
FIG. 4 illustrates a block diagram of functional modules of an electronic device according to an embodiment of the present application.

FIG. 4 illustrates a block diagram of functional modules of an electronic device 200 according to an embodiment of the present application. In addition to the units shown in FIG. 3, the electronic device 200 further includes: a judging unit 201, configured to judge whether the time-frequency resources corresponding to the idle CSI-RS ports meet a first predetermined condition; and if the first predetermined condition is met, the allowing unit 101 allows the current cell to use at least a part of the time-frequency resources corresponding to the idle CSI-RS ports to transmit data.

Similarly, each of the units in the electronic device 200 may be implemented, for example, by one or more processing circuitries, and the processing circuitry can be implemented as a chip, for example. The electronic device 200 may be, for example, located at a base station side of the cell, or communicatively coupled with the base station in a wired or wireless manner.

For example, a cell may be allowed to use a part or all of the idle CSI-RS resources to transmit data only when there are many idle CSI-RS resources. Exemplarily, the first predetermined condition is that a total number of the time-frequency resources corresponding to the idle CST-RS ports of at least a part of the CSI-RS configurations which can be used by the cell is greater than a first predetermined threshold.

In an example, the first predetermined condition is that the total number of time-frequency resources corresponding to all idle CSI-RS ports of all CSI-RS configurations different from the CSI-RS configuration of the current cell itself is greater than the first predetermined threshold. For example, the first predetermined condition may be expressed by the following formula:

$$\sum_i R_i \geq Th1, i \in CSI\text{-}RS \text{ configuration} \quad (1)$$

and $i \neq$ own $CSI\text{-}RS$ configuration where $R_i$ represents the number of the idle resources of the CSI-RS configuration i, and Th1 is the first predetermined threshold, where Th1 depends on factors such as the overhead of signaling bits, the data throughput increased by using idle CSI-RS resources to transmit data, the expected maximum increasing proportion of the data throughput.

In another example, the at least a part of the CSI-RS configurations may include a CSI-RS configuration the number of idle CSI-RS ports of which exceeds a predetermined value, which is referred to as an idle CSI-RS configuration. In the present embodiment, an idle CSI-RS port that can be used by the current cell is limited to an idle CSI-RS port of a CSI-RS configuration other than the CSI-RS configuration of the current cell. Hence, the idle CSI-RS configuration herein refers to a CSI-RS configuration that meets the above-mentioned limitation of the number of the idle CSI-RS ports and is different form the CSI-RS configuration of the current cell. In this case, the first predetermined condition can be expressed by the following formula (2).

$$\sum_i R_i \geq Th1, i \in \text{idle } CSI\text{-}RS \text{ configuration} \quad (2)$$

and $i \neq$ own $CSI\text{-}RS$ configuration

In addition, it may be set that only a part of the time-frequency resources corresponding to idle CSI-RS ports of idle CSI-RS configurations are allowed for use. For example, the number of the time-frequency resources corresponding to the idle CSI-RS ports of each idle CSI-RS configuration which can be used by the current cell is a fixed value less than or equal to a predetermined value. In this case, the total number is a product of the number of the idle CSI-RS configurations and the fixed value. The first predetermined condition can be expressed by the following formula (3).

$$\sum_i C_i = C \times N \geq Th1, i \in \text{idle } CSI\text{-}RS \text{ configuration} \quad (3)$$

and $i \neq$ own $CSI\text{-}RS$ configuration where $C_i$ represents the number of available resources of the idle CSI-RS configuration i, which is C for each idle CSI-RS configuration, and N is the number of the idle CSI-RS configurations.

In addition, the judging unit 201 may be further configured to judge whether the time-frequency resources corresponding to the idle CSI-RS ports meet a second predetermined condition. If the second predetermined condition is met, the allowing unit 101 prohibits the current cell from using the time-frequency resources corresponding to the idle CSI-RS ports to transmit data.

Alternatively, the judging unit 201 may be configured to judge whether the time-frequency resources corresponding to the idle CSI-RS ports meet the second predetermined condition during a period in which the current cell uses the time-frequency resources corresponding to the idle CSI-RS ports to transmit data. If the second predetermined condition is met, the allowing unit 101 prohibits the current cell from using the time-frequency resources corresponding to the idle CSI-RS ports to transmit data.

For example, the cell is prohibited from using the idle CSI-RS resources to transmit data in a case that the idle CSI-RS resources are less. Exemplarily, the second predetermined condition is that the total number of the time-frequency resources corresponding to the idle CSI-RS ports of at least a part of CSI-RS configurations which can be used by the cell is less than a second predetermined threshold. The method for calculating the total number of the time-frequency resources may be one of the above methods, and may be the same as or different from the calculation method in judging the first predetermined condition. It is not restrictive, and can be chosen depending on the actual application.

The second predetermined threshold depends on factors such as the overhead of signaling bits, the data throughput increased by using idle CSI-RS resources to transmit data, the expected minimum increasing proportion of the data throughput. The second predetermined threshold may be less than the first predetermined threshold.

In addition, the determining unit 102 may be further configured to periodically update usage status of the CSI-RS ports of CSI-RS configurations during a period in which the cell uses the time-frequency resources corresponding to the idle CST-RS ports to transmit data. This is because the usage status of the CSI-RS ports in each cell is changed in a real time manner. The idle conditions of the CSI-RS ports can be obtained more accurately by updating the usage status periodically. In this way, adjusting the time-frequency resources corresponding to the idle CSI-RS ports for transmitting data accordingly will help further reduce the interference to the CSI-RS transmission of the adjacent cell.

It should be noted that, the use by the adjacent cell of CSI-RS ports of the CSI-RS configuration allocated to the adjacent cell is not affected by the technology of the present application. That is, the adjacent cell may use any CSI-RS port of the CSI-RS configuration of the adjacent cell, regardless of whether the CSI-RS port is being used to transmit data by other cells. When a cell uses an idle CSI-RS resource of an adjacent cell to transmit data, if the adjacent cell starts to use the idle CSI-RS resource to transmit CSI-RS, due to delay in processing, interference may be produced to current data transmission of the current cell in a certain time range. However, the interference is within an acceptable range since there are only a small percentage of the resource elements for data transmission subjected to the interference. Subsequently, after it is detected that the CSI-RS resource used by the current cell is no longer idle, the current cell may stop using the CSI-RS resource to transmit data or use the idle CSI-RS resources of other adjacent cells to continue transmitting data.

In the present embodiment, the idle CSI-RS resources are used to transmit data according to a specific condition, thereby optimizing the use of the idle CSI-RS resources and improving the utilization efficiency of the CSI-RS resources.

Third Embodiment

Figure 5:
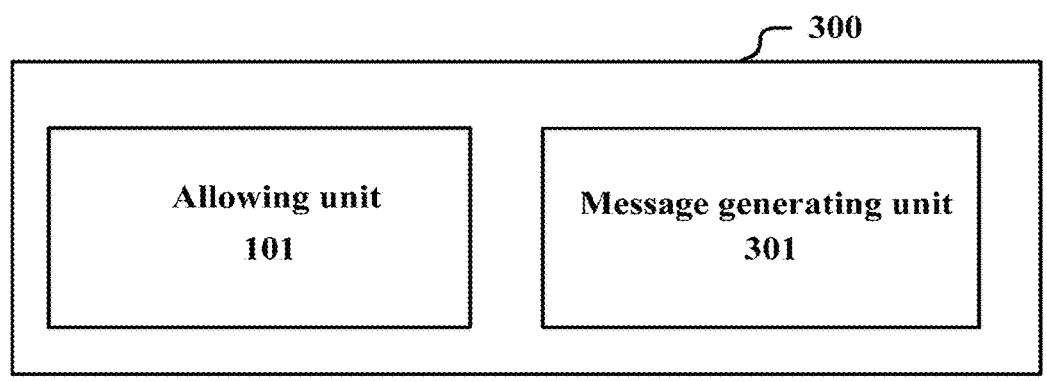
FIG. 5 illustrates a block diagram of functional modules of an electronic device according to another embodiment of the present application.

FIG. 5 illustrates a block diagram of functional modules of an electronic device 300 according to another embodiment of the present application. In addition to the allowing unit 101 shown in FIG. 3, the electronic device 300 further includes a message generating unit 301, configured to generate an indication message for indicating to a user equipment of the current cell the time-frequency resources corresponding to available idle CSI-RS ports. In addition, although it is not illustrated in FIG. 5, the electronic device 300 may further include any one of the determining unit 102 and the judging unit 201 described above.

Similarly, each of the units in the electronic device 300 may be implemented, for example, by one or more processing circuitries, and the processing circuitry can be implemented as a chip, for example. The electronic device 300 may be, for example, located at a base station side of the cell, or communicatively coupled with the base station in a wired or wireless manner.

In an example, the indication message includes information on the number of the time-frequency resources corresponding to the idle CSI-RS ports of each CSI-RS configuration which can be used by the user equipment. The base station and the user equipment have consistent understanding of the rule for the usage of the CSI-RS ports. For example, the user equipment knows which CSI-RS ports are to be used preferentially, for example, in the case of using the CSI-RS configurations in a fixed order, for example, when only four ports are needed, ports 0 to 3 can be used first. Hence, after learning the information on the number of time-frequency resources corresponding to available idle CSI-RS ports, the user equipment can determine positions of the time-frequency resource elements to be used, so as to use the time-frequency resources to transmit data.

The time-frequency resources corresponding to the idle CSI-RS ports which can be used by the user equipment may be all or only a part of idle CSI-RS resources, for example, which may be determined by the determining unit 102 according to actual needs or predefined rules or the like. For example, idle CSI-RS resources which can be used by the user equipment may be determined in the same manner as that adopted when the first predetermined condition is judged.

Figure 6:
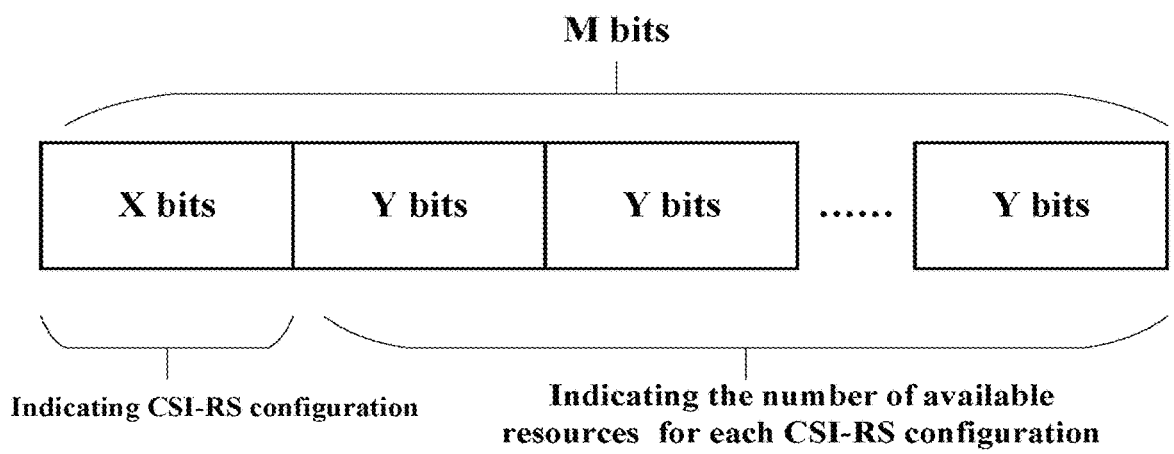
FIG. 6 illustrates an example of a form of an indication message.

The indication message may have various forms. Each of FIGS. 6 to 9 illustrates an example of a form of an indication message. FIG. 6 illustrates an example of a relatively complete indication message, in which the indication message includes bitmap information representing whether there is an available idle CSI-RS port in each CSI-RS configuration, that is, the first X bits in FIG. 6. A corresponding bit of the bitmap being 0 indicates that an idle CSI-RS of a corresponding CSI-RS configuration is unavailable or there is no idle CSI-RS. In addition, after the X bits, one group of Y bits are used to indicate the number of the time-frequency resources corresponding to available idle CSI-RS ports of one CSI-RS configuration. The corresponding number being 0 may be used to indicate that idle CSI-RS corresponding to the CSI-RS configuration is unavailable or there is no idle CSI-RS.

Here, the number of bits of the bitmap depends on the total number of CSI-RS configurations. For example, in a case of five CSI-RS configurations totally, the number of bits X of the bitmap is five. The value of Y depends on the maximum number of resources that are allowed to be used. For example, when the CSI-RS configuration includes eight ports, a maximum value of Y being three is sufficient to indicate various number situations.

Figure 7:
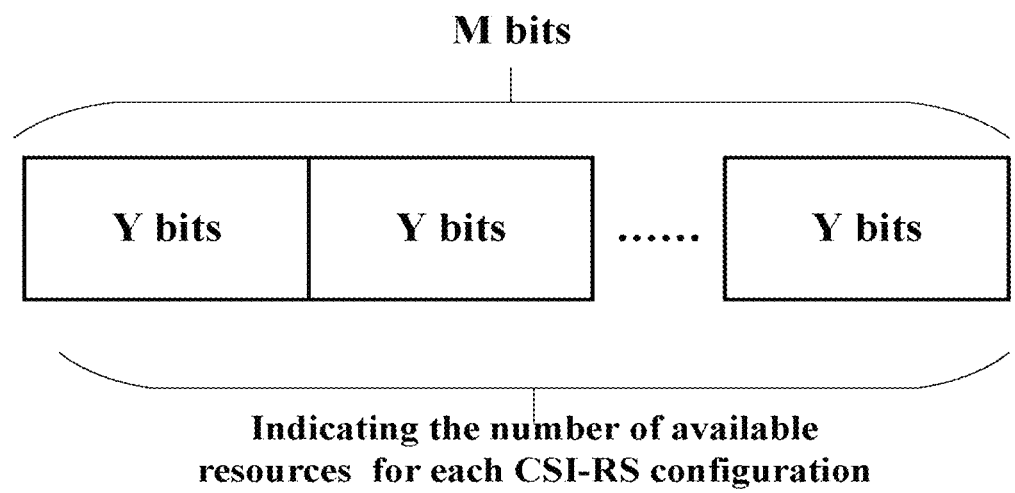
FIG. 7 illustrates another example of a form of an indication message.

FIG. 7 illustrates a simplified form in which the first X bits are omitted. In the example of FIG. 7, it is assumed that an arrangement order of the CSI-RS configurations is agreed in advance. In other words, the user equipment knows which CSI-RS configuration corresponds to the first group of Y bits, and which CSI-RS configuration corresponds to the second group of Y bits, and so on. In this case, for the CSI-RS configuration used by the current cell, the number of the available CSI-RS resources may be set to 0 (that is, the Y bits in a corresponding group are all set to 0).

Figure 8:
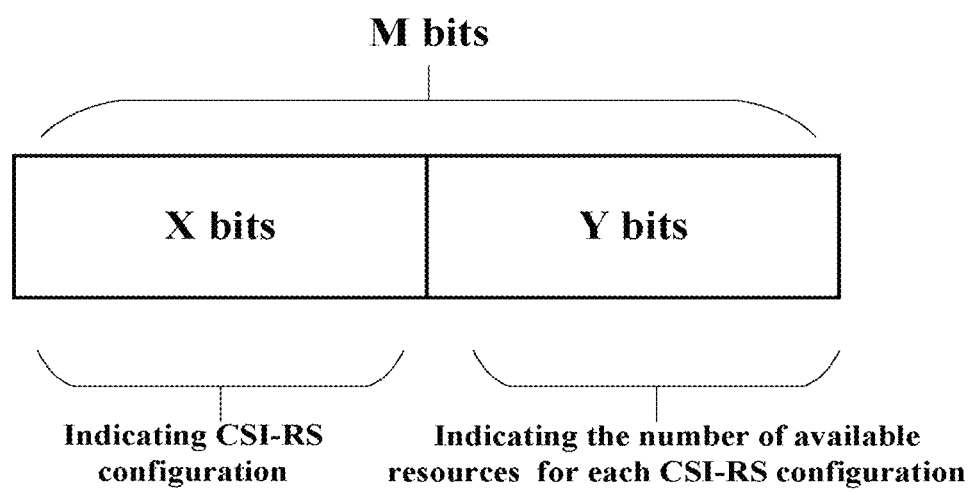
FIG. 8 illustrates another example of a form of an indication message.

FIG. 8 illustrates another simplified form in which there is only one group of Y bits after X bits. In this example, the number of the time-frequency resources corresponding to the idle CSI-RS ports of each CSI-RS configuration which can be used by the user equipment is the same. Hence, only one group of Y bits is needed to indicate information on the number. The X bits are still used to indicate bitmap information representing whether there is an available idle CSI-RS port in each CSI-RS configuration.

Figure 9:
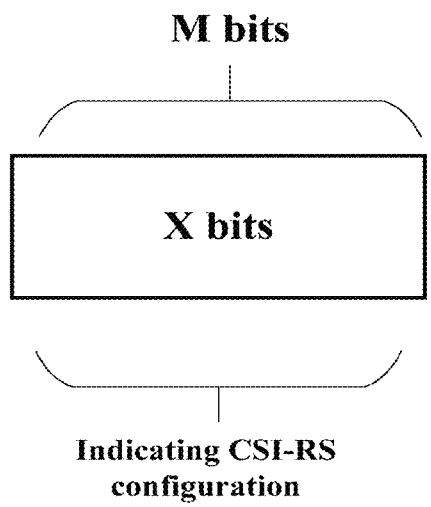
FIG. 9 illustrates another example of a form of an indication message.

FIG. 9 illustrates a further simplified form of FIG. 8 in which the indication message includes only bitmap information indicating whether there is an available idle CSI-RS port in each CSI-RS configuration. In this case, the number of resources in each CSI-RS configuration to be used by the user equipment may be specified in advance, that is, the number is fixed for each CSI-RS configuration. The fixed number may be the same or different for different CSI-RS configurations. Hence, it is only necessary to inform the user equipment of the fact the idle resources of which CSI-RS configuration are available without requiring the following information bits indicating a specific number.

It should be understood that the above is only an example of the indication message, and the form is not limited thereto. In addition, a more simplified form may also be provided, for example, the indication message includes only one bit. When the one bit is 0, no idle port of any CSI-RS configuration is available. When the one bit is 1, for each CSI-RS configuration (which may include the CSI-RS configuration used by the current cell or may not include the CSI-RS configuration used by the current cell), a predetermined fixed number of CSI-RS resources may be used to transmit data, and the fixed number may be the same or different for each CSI-RS configuration. Alternatively, one group of Y bits is used to indicate the predetermined number of resources to be used in each of several CSI-RS configurations (the predetermined number of resources is the same for all configurations).

In addition, the message generating unit 301 is further configured to generate a prohibiting message for indicating to the user equipment of the cell that the time-frequency resources corresponding to the idle CSI-RS ports are prohibited from being used. In an example, the prohibiting message has the same form as the indication message described above, except that each bit of the bitmap is set to indicate that each CSI-RS configuration has no available idle resource, and/or bits indicating the number of resources are all set to 0. In another example, the prohibiting message may be generated as a one-bit instruction. That is, after receiving the instruction, the user equipment learns that the idle CSI-RS resources are prohibited from being used. This method can effectively reduce the signaling overhead.

Fourth Embodiment

Figure 10:
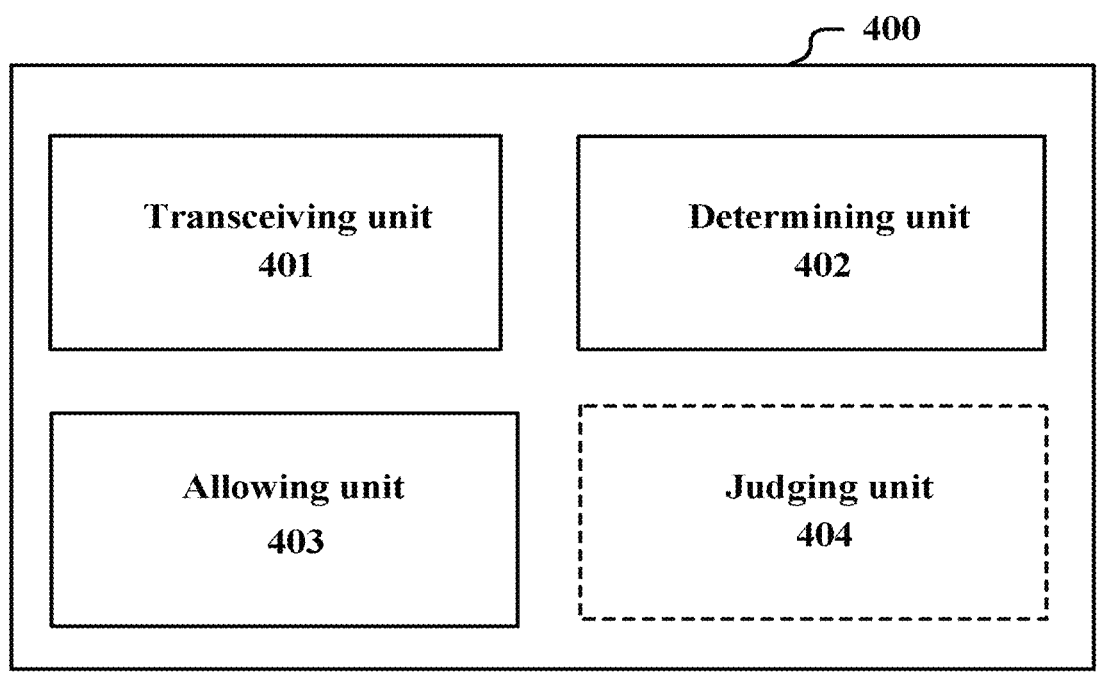
FIG. 10 illustrates a block diagram of functional modules of an information processing device according to an embodiment of the present application.

FIG. 10 illustrates a block diagram of functional modules of an information processing device 400 according to an embodiment of the present application. The information processing device 400 may be a base station or a part of a base station, for example. For example, a transceiving unit 401 may be implemented with an antenna or a communication interface. A determining unit 402, an allowing unit 403, and a judging unit 404, for example, may be implemented by one or more processing circuitries, and the processing circuitry may be implemented as a chip, for example.

In an example, the information processing device 400 includes a transceiving unit 401, a determining unit 402, and an allowing unit 403. The transceiving unit 401 may be configured to receive, from a base station of an adjacent cell of a cell, information containing usage status of CSI-RS ports of the adjacent cell, where the adjacent cell is a cell within an interference range of the current cell. In addition, the determining unit 402 is configured to determine the usage status of the CSI-RS ports of the adjacent cell based on the received information, and determine the time-frequency resources corresponding to idle CSI-RS ports of each CSI-RS configuration based on the usage status of the ports. The allowing unit 403 is configured to allow the cell to use at least a part of the time-frequency resources corresponding to the idle CSI-RS ports of the CSI-RS configuration different from the CSI-RS configuration of the cell to transmit data. The determining unit 402 in the present embodiment has a similar function to the determining unit 102, and the allowing unit 403 has a similar function to the allowing unit 101. Hence, the relevant details are omitted in the description of this embodiment.

In this example, the information processing device 400 may further include: a judging unit 404, configured to judge whether the time-frequency resources corresponding to the idle CSI-RS ports meet a first predetermined condition. If the first predetermined condition is met, the allowing unit 403 allows the current cell to use at least a part of the time-frequency resources corresponding to the idle CSI-RS ports to transmit data. The judging unit 404 has a similar function to the judging unit 201, and will not be repeatedly described herein.

In this example, the transceiving unit 401 is further configured to transmit information containing usage status of CSI-RS ports of the current cell to the base station of the adjacent cell. That is, the information on the usage status of the CSI-RS ports is exchanged between the base stations of the adjacent cells, for example, via X2 signaling. For example, this information is contained in the information element Served Cell Information of the ENB CONFIGURATION UPDATE message. The specific configuration of the information may refer to the first embodiment, which is not repeated here.

In another example, the transceiving unit 401 may be configured to receive information containing the usage status of the CSI-RS ports of the adjacent cell of the cell from a central management apparatus. In this example, the information is not directly exchanged between the base stations of the adjacent cells, but is centrally managed and provided by the central management apparatus.

In yet another example, the transceiving unit 401 may be configured to receive information on the time-frequency resources, such as the number of the time-frequency resources, corresponding to the idle CSI-RS ports of other CSI-RS configurations different from the CSI-RS configuration of the current cell from the central management apparatus. In this example, the function of the determining unit 402 is performed by the central management apparatus, and the determination result of the determining unit 402 is provided to the current cell. In this case, the information processing device 400 may include the transceiving unit 401, the allowing unit 403 and the judging unit 404. Alternatively, the information processing device 400 may include only the transceiving unit 401 and the allowing unit 403.

In another example, the transceiving unit 401 may be configured to receive the idle CSI-RS ports of each CSI-RS configuration that can be used by the current cell from the central management apparatus. In this example, the function of the determining unit 402 and the function of the judging unit 404 are performed by the central management apparatus, and the final determining result is provided to the current cell. In this case, the information processing device 400 may include the transceiving unit 401 and the allowing unit 403.

In addition, in this embodiment, the transceiving unit 401 is further configured to transmit an indication message for indicating the time-frequency resources corresponding to available idle CSI-RS ports to a user equipment of the current cell. The transceiving unit 401 may further transmit a prohibiting message for indicating that the time-frequency resources corresponding to the idle CSI-RS ports are prohibited from being used to a user equipment of the current cell, where the prohibiting message may be an indication message of a specific value, or a dedicated prohibiting message, as described in the third embodiment.

The information processing device according to the present embodiment enables the current cell to use idle CSI-RS resources of other CSI-RS configurations to transmit data, thereby improving the utilization efficiency of the CSI-RS resource.

Fifth Embodiment

Figure 11:
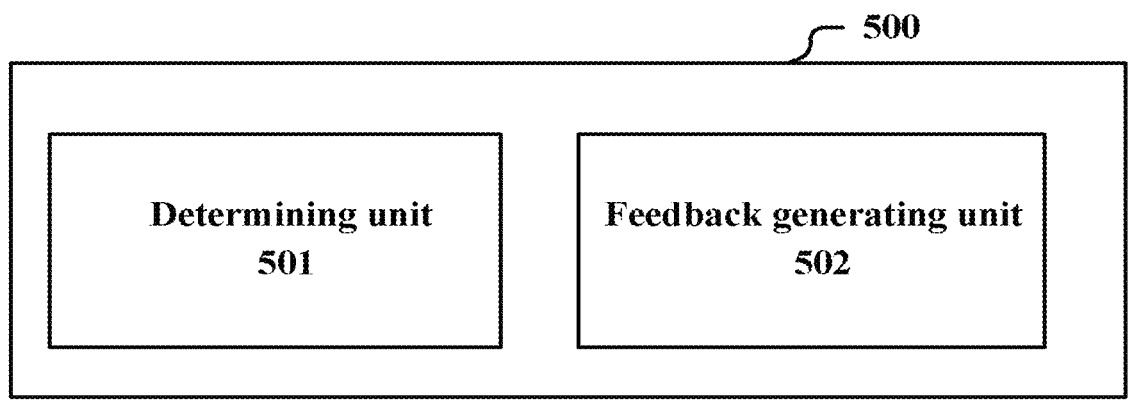
FIG. 11 illustrates a block diagram of functional modules of an electronic device according to an embodiment of the present application.

FIG. 11 illustrates a block diagram of functional modules of an electronic device 500 according to an embodiment of the present application. The electronic device 500 includes: a determining unit 501, configured to determine, based on a message received from a base station, time-frequency resources corresponding to idle CSI-RS ports of a CSI-RS configuration different from a CSI-RS configuration used by the base station itself which can be used by a user equipment to transmit data; and a feedback generating unit 502, configured to generate a message containing a user equipment feedback.

Each of the units in the electronic device 500 may be implemented, for example, by one or more processing circuitries, and the processing circuitry can be implemented as a chip, for example. The electronic device 500 may be located at a user equipment side of the cell, for example, or be communicatively coupled with the user equipment in a wired or wireless manner.

The message received from the base station is, for example, the foregoing indication message containing information on the number of the time-frequency resources corresponding to the idle CSI-RS ports of each CSI-RS configuration that can be used by the user equipment. It should be understood that the received message is not limited thereto, as long as the message contains the information on the time-frequency resources corresponding to the idle CSI-RS ports that can be used by the user equipment to transmit data.

In addition, in a case that the received message is a prohibiting message or in a case that the determined number of the time-frequency resources is 0 (in a broad sense, it is also one of the prohibiting messages), the user equipment is prohibited from using the time-frequency resources corresponding to the idle CSI-RS ports to transmit data.

Regardless of the content of the received message, the feedback generating unit 502 generates a message including the user equipment feedback. The user equipment feedback includes, for example, one of accepting and refusing. For example, a one-bit signaling open_close_response may be defined for the user equipment feedback, such as 1 for acceptance, 0 for refusing, or the opposite definition is used.

In a case that the received message indicates that the user equipment is allowed to use the time-frequency resources corresponding to the idle CSI-RS ports to transmit data, the user equipment feedback of acceptance indicates that the user equipment agrees to use the above-described time-frequency resources, and the user equipment feedback of refusing indicates that the user equipment disagrees to use the above-described time-frequency resources. In a case that the received information is a prohibiting message, the user equipment feedback of acceptance indicates that the user equipment agrees not to use the above-described time-frequency resources, and the user equipment feedback of refusing indicates that the user equipment disagrees not to use the above-described time-frequency resources. For example, in the case that the user equipment has used the above-described time-frequency resources to transmit data, the user equipment feedback of refusing to the prohibiting message means that the user equipment will continue to use the above-described time-frequency resources.

The electronic device 500 according to the present embodiment enables the user equipment to utilize the time-frequency resources corresponding to the idle CSI-RS ports, thereby improving the utilization efficiency of the CSI-RS resource.

Sixth Embodiment

Figure 12:
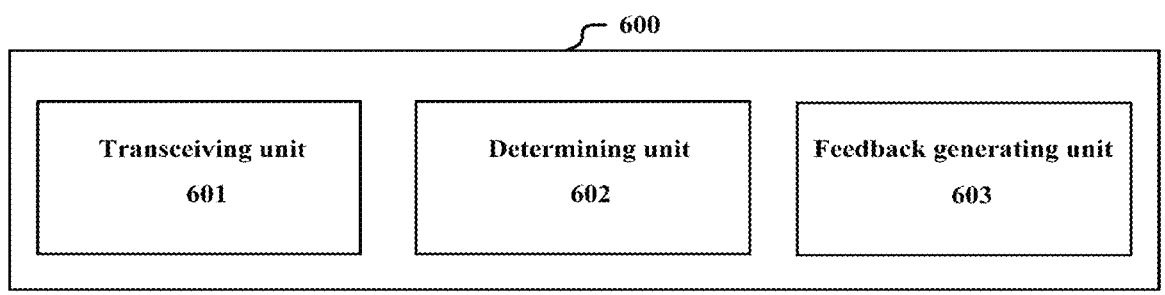
FIG. 12 illustrates a block diagram of functional modules of an information processing device according to an embodiment of the present application.

FIG. 12 illustrates a block diagram of functional modules of an information processing device 600 according to an embodiment of the present application, and the information processing device 600 includes: a transceiving unit 601, configured to receive a message from a base station; a determining unit 602, configured to determine, based on the received message, time-frequency resources corresponding to idle CSI-RS ports of a CSI-RS configuration different from a CSI-RS configuration used by the base station itself which can be used by the user equipment to transmit data; and a feedback generating unit 603, configured to generate a message containing a user equipment feedback, where the transceiving unit 601 is further configured to transmit the message containing the user equipment feedback to the base station.

The information processing device 600 may be a user device or a part of a user device, for example. The transceiving unit 601 can be implemented with an antenna or a communication interface, for example. The determining unit 602 and the feedback generating unit 603 may be implemented, for example, by one or more processing circuitries, and the processing circuitry can be implemented as a chip, for example.

The determining unit 602 in the present embodiment has a similar function to the determining unit 501, and the feedback generating unit 603 has a similar function to the feedback generating unit 502. Hence, the relevant details are omitted in the description of the present embodiment.

Seventh Embodiment

Figure 13:
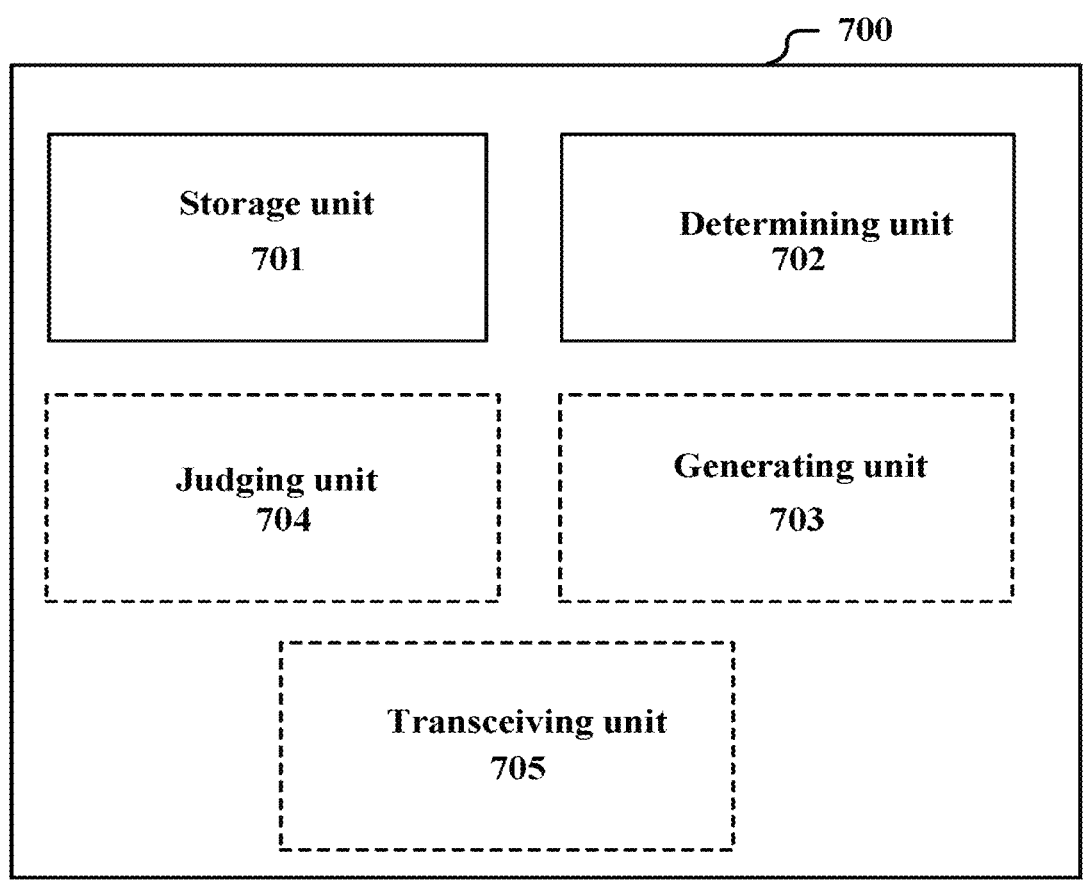
FIG. 13 illustrates a block diagram of functional modules of an electronic device according to an embodiment of the present application.

FIG. 13 illustrates a block diagram of functional modules of an electronic device 700 according to an embodiment of the present application. The electronic device 700 includes: a storage unit 701, configured to store usage status of CSI-RS ports of each cell; and a determining unit 702, configured to determine, for each cell, usage status of CST-RS ports of an adjacent cell of the cell. As mentioned above, the adjacent cell may be a cell within an interference range of the cell or a cell that is geographically adjacent to the cell.

The electronic device 700 may, for example, be a central processing apparatus or a part of a central processing apparatus. For example, the central processing apparatus may be implemented at a core network side or implemented as an entity such as a server. The storage unit 701 may be implemented as, for example, a memory including, for example, various volatile memories and non-volatile memories.

In an example, the determining unit 702 may perform further processing, for example, for each cell, determine, based on usage status of ports of the cell, time-frequency resources corresponding to the idle CSI-RS ports of a CSI-RS configuration different from a CSI-RS configuration of the cell itself. The function of the determining unit 702 is the same as the function of the determining unit 102, and will not be repeated here.

In this example, as shown by a dotted-line block in FIG. 13, the electronic device 700 may further include: a generating unit 703, configured to generate a message containing information of time-frequency resources corresponding to idle CSI-RS ports of a CSI-RS configuration different from a CSI-RS configuration of the cell itself.

Alternatively, a generating operation of the generating unit 703 is based on a certain condition. As shown by another dotted-line block in FIG. 13, the electronic device 700 may further include: a judging unit 704, configured to judge, for each cell, whether the determined idle conditions of the CSI-RS ports of the CSI-RS configuration different from the CSI-RS configuration of the cell meets a first predetermined condition, and the above-mentioned message is generated in the case that the first predetermined condition is met. In this case, the generating unit 703 may directly generate a message containing information on the idle CSI-RS resources that can be used by the corresponding cell.

In addition, the judging unit 704 may be further configured to judge, for each cell, whether the determined idle conditions of the CSI-RS configuration different from the CSI-RS configuration of the cell meets a second predetermined condition, and a prohibiting message is generated in the case that the second predetermined condition is met, where the prohibiting message indicates that the cell is prohibited from using the idle CSI-RS ports to transmit data. The judgment for the second predetermined condition may be performed when the cell uses the idle CSI-RS ports to transmit data, or may be performed when the cell does not use the idle CSI-RS ports to transmit data.

As shown by another dotted-line block in FIG. 13, the electronic device 700 may further include: a transceiving unit 705, configured to receive the usage status of the CSI-RS ports of a corresponding cell from the base station. The transceiving unit 705 can be implemented, for example, with an antenna or a communication interface such as a transceiver. The determining unit 702, the generating unit 703 and the judging unit 704 may be implemented, for example, by one or more processing circuitries, and the processing circuitry can be implemented as a chip, for example.

Specifically, the transceiving unit 705 may further be configured to transmit the usage status of the CSI-RS ports of the adjacent cell of the corresponding cell or transmit the message generated by the generating unit 703 to the base station of the corresponding cell. The contents and the formats of the first predetermined condition, the second predetermined condition, and the message have been already described in detail in the foregoing and will not be repeated here. However, it should be understood that these are not limitative, but merely examples given for ease of understanding.

In addition, the transceiving unit 705 is further configured to transmit a prohibiting message to the base station of the corresponding cell, where the prohibiting message indicates that the corresponding cell is prohibited from using the idle CSI-RS ports to transmit data. The prohibiting message may be, for example, one-bit signaling.

It can be seen that, the electronic device 700 may only collect and provide the usage status of CSI-RS ports of each cell, and may perform further processing on the usage status of these ports to obtain information on the idle CSI-RS resources that can be used by the corresponding cell and provide it to the base station of the cell.

The electronic device 700 according to the present embodiment can assist the cell to use the idle CSI-RS resources to transmit data, thereby improving the utilization efficiency of the CSI-RS resource.

Eighth Embodiment

In the process of describing the electronic device and information processing device in the embodiments described above, obviously, some processing and methods are also disclosed. Hereinafter, an overview of the methods is given without repeating some details disclosed above. However, it should be noted that, although the methods are disclosed in a process of describing the electronic device and information processing device, the methods do not certainly employ or are not certainly executed by the aforementioned components. For example, the embodiments of the electronic device and information processing device may be partially or completely implemented with hardware and/or firmware, the method described below may be executed by a computer-executable program completely, although the hardware and/or firmware of the electronic device and information processing device can also be used in the methods.

Figure 14:
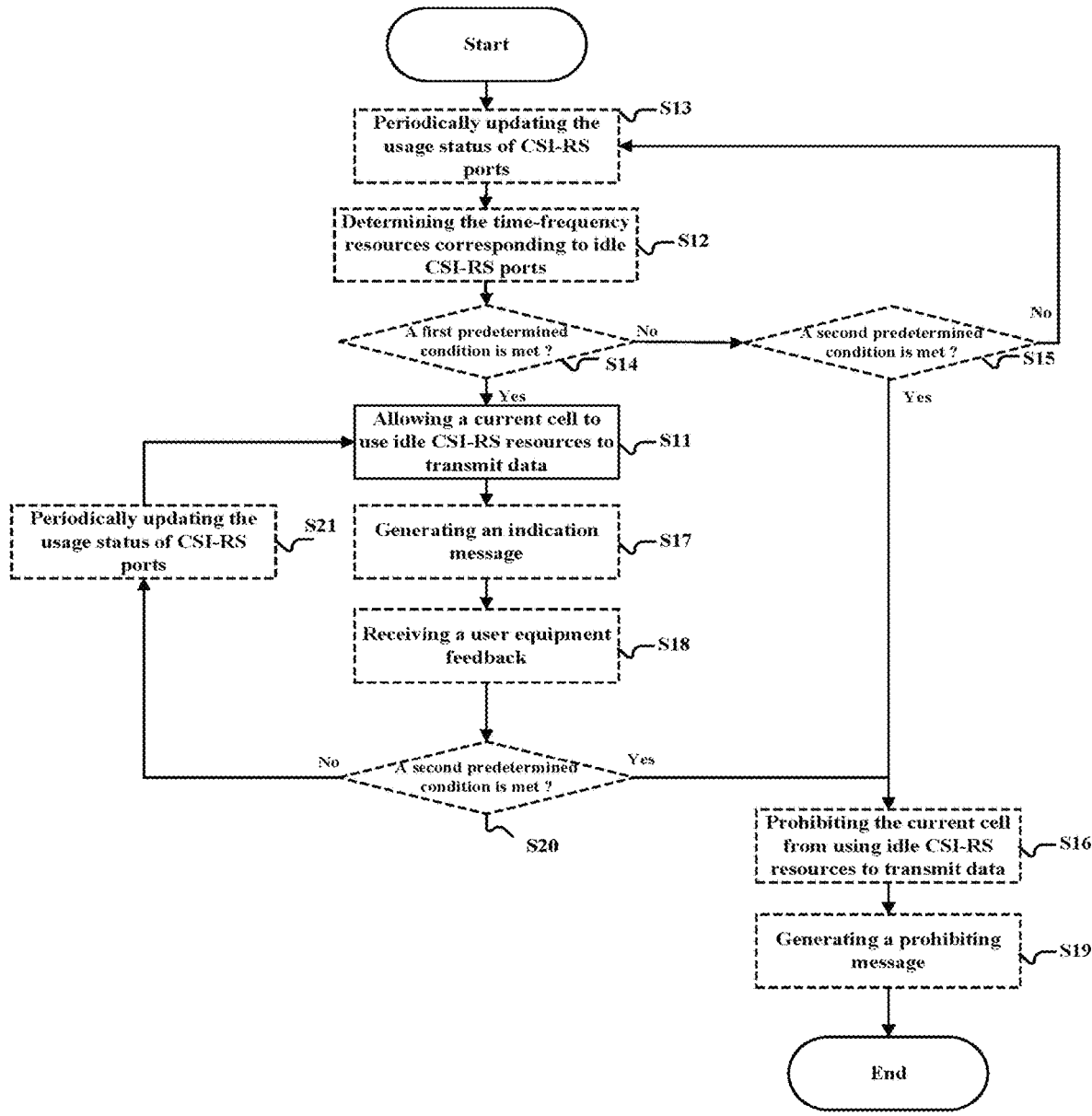
FIG. 14 illustrates a flowchart of a method for an electronic device according to an embodiment of the present application.

FIG. 14 illustrates a flowchart of a method for an electronic device according to an embodiment of the application. The method includes: allowing a cell to use at least a part of time-frequency resources corresponding to idle channel state information reference signal (CSI-RS) ports of a CSI-RS configuration different from a CSI-RS configuration of the cell itself to transmit data (S11).

As shown by the dotted-line block in FIG. 14, the method may further include: determining usage status of CSI-RS ports of an adjacent cell of the cell, and determining time-frequency resources corresponding to idle CSI-RS ports of each CSI-RS configuration based on the usage status of the ports (S12). In addition, although step S12 is shown before step S11 in FIG. 14, it is not limited thereto, and step S12 may be performed after step S11.

In addition, before performing step S11, step S14 may further be performed. In step S14, it is judged whether the time-frequency resources corresponding to the idle CSI-RS ports meet a first predetermined condition. If the first predetermined condition is met (YES), the process proceeds to step S11. Step S17 is performed subsequently, and in step S17, it is generated an indication message for indicating to a user equipment of the cell the time-frequency resources corresponding to available idle CSI-RS ports. The feedback from the user equipment is received in step S18. When the feedback is acceptance, the user equipment uses the idle CSI-RS resources to transmit data. In step S20 of the method, it is judged whether the time-frequency resources corresponding to the idle CSI-RS ports meet a second predetermined condition. If the second predetermined condition is not met, the process proceeds to step S20 in which usage status of the CSI-RS ports of CSI-RS configurations is updated periodically. If the second predetermined condition is met, the process proceeds to step S16 in which the cell is prohibited from using the time-frequency resources corresponding to the idle CSI-RS ports to transmit data. Then the process proceeds to S19 in which it is generated a prohibiting message for indicating to a user equipment of the cell that the time-frequency resources corresponding to the idle CSI-RS ports are prohibited from being used. In addition, although not shown in the FIG. 14, after step S19, the step of receiving the user equipment feedback may be further included.

On the other hand, when it is judged in step S14 that the first predetermined condition is not met, step S15 may further be performed. In step S15, it is judged whether the time-frequency resources corresponding to the idle CSI-RS ports meet a second predetermined condition. If the second predetermined condition is met, the process proceeds to steps S16 and S19. If the second predetermined condition is not met, the process may proceed to step S13 in which usage status of the CSI-RS ports of the CSI-RS configurations is periodically updated, and the process of step S13 is the same as the process of step S20. Here, if the current cell has not used the idle CSI-RS resources to transmit data, the judgment in step S15 may be skipped, and the process directly returns to step S13.

It should be understood that, although an example of a flowchart of the method is shown in FIG. 14, the steps of the method according to the present application are not limited thereto. The method of the present application may only include some of the processing steps therein, or the order of the processing steps is not limited to the illustrated order. For example, the order of steps S14 and S15 may be interchanged.

As an example, the first predetermined condition in step S14 is that the total number of the time-frequency resources corresponding to the idle CSI-RS ports of at least a part of the CSI-RS configurations which can be used by the cell is greater than a first predetermined threshold. The second predetermined condition in step S15 is that the total number of the time-frequency resources corresponding to the idle CSI-RS ports of at least a part of the CSI-RS configurations which can be used by the cell is less than a second predetermined threshold.

For example, the at least a part of the CSI-RS configurations include a CSI-RS configuration the number of idle CSI-RS ports of which exceeds a predetermined value, which is referred to as an idle CST-RS configurations. Exemplarily, the number of time-frequency resources corresponding to the idle CSI-RS ports of each idle CSI-RS configuration that can be used by the cell is a fixed value less than or equal to the predetermined value. In this case, the total number is a product of the number of the idle CSI-RS configurations and the fixed value.

For a CSI-RS configuration used by two or more adjacent cells, the number of the time-frequency resources corresponding to the idle CSI-RS ports of the CSI-RS configuration of the adjacent cell with the fewest idle CSI-RS ports is taken as the number of the time-frequency resources corresponding to the idle CSI-RS ports of the CSI-RS configuration.

In addition, the indication message generated in step S17 includes information on the number of the time-frequency resources corresponding to the idle CSI-RS ports of each CSI-RS configuration which can be used by the user equipment. For example, the numbers of the time-frequency resources corresponding to the idle CSI-RS ports of each CSI-RS configuration which can be used by the user equipment may be set to be the same.

In an example, the indication message includes bitmap information representing whether there is an available idle CSI-RS port in each CSI-RS configuration. The corresponding number being 0 or the corresponding bit of the bitmap being 0 indicates that the idle CSI-RS of the corresponding CSI-RS configuration is unavailable.

The prohibiting message generated in step S19 may be an indication message having a specific value, or may be a one-bit instruction.

In an example, the usage status of CSI-RS ports of an adjacent cell may be obtained based on X2 signaling from a base station of the adjacent cell in steps S13 and S20. The X2 signaling is, for example, an ENB CONFIGURATION UPDATE message, and the ENB CONFIGURATION UPDATE includes an information element indicating information on the usage status of the CSI-RS ports in the CSI-RS configuration of the adjacent cell. The information element is, for example, in the form of a bitmap. The number of bits of the bitmap depends on the number of the CSI-RS ports of the CSI-RS configuration. For example, one bit of the bitmap being 0 indicates that the corresponding CSI-RS port is not used, and one bit of the bitmap being 1 indicates that the corresponding CSI-RS port is being used. This information element may be included in the information element Served Cell Information of the ENB CONFIGURATION UPDATE message.

In addition, in steps S13 and S20, the usage status of the CSI-RS ports may be updated by receiving the information from the central management apparatus.

Accordingly, although not shown in FIG. 14, the method may further include the step of receiving information including the usage status of the CSI-RS ports. Moreover, the method may further include the step of sending an indication message or a prohibiting message to the user equipment.

Figure 15:
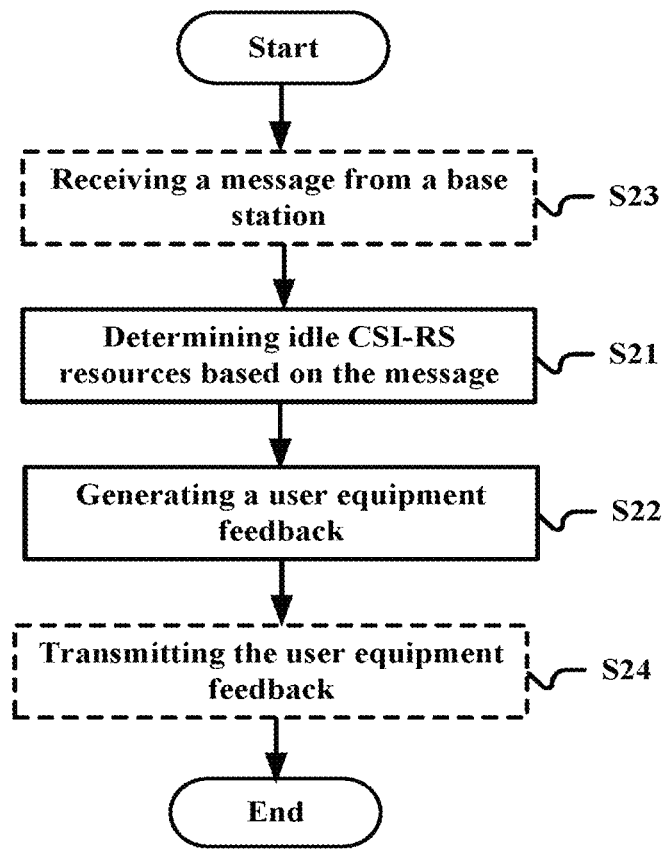
FIG. 15 illustrates a flowchart of a method for an electronic device according to another embodiment of the present application.

FIG. 15 illustrates a flowchart of a method for an electronic device according to another embodiment of the present application. The method includes: determining, based on a message received from a base station, time-frequency resources corresponding to idle CSI-RS ports of a CSI-RS configuration different from a CSI-RS configuration used by the base station itself, which can be used by a user equipment to transmit data (S21); and generating a message including a user equipment feedback (S22). For example, the user equipment feedback includes one of accepting and refusing.

In a case that the message received from the base station is a prohibiting message or the determined number of the time-frequency resources is 0, the user equipment is prohibited from using the time-frequency resource corresponding to the idle CSI-RS ports to transmit data.

As shown in the dotted-line block in FIG. 15, the method may further include: step S23 of receiving a message from a base station; and step S24 of transmitting a message including the user equipment feedback to the base station.

Figure 16:
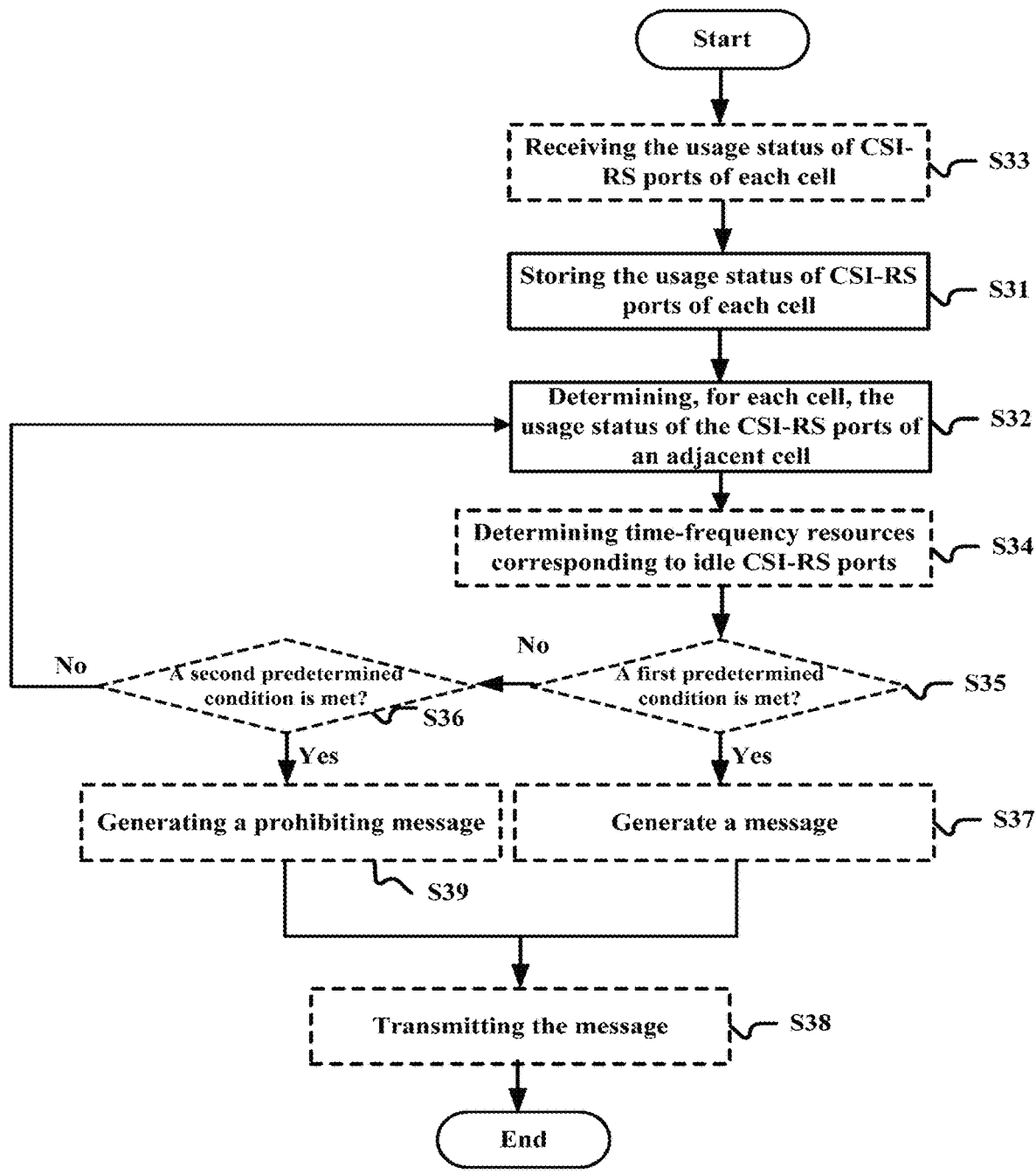
FIG. 16 illustrates a flowchart of a method for an electronic device according to yet another embodiment of the present application.

FIG. 16 illustrates a flowchart of a method for an electronic device according to yet another embodiment of the present application. The method includes: storing usage status of CSI-RS ports of each cell (S31); and determining, for each cell, usage status of CSI-RS ports of an adjacent cell of the cell (S32).

In addition, as shown by a dotted-line block in FIG. 16, the method may further include step S33 of receiving the usage status of the CSI-RS ports of the corresponding cell from the base station.

The above method may further include step S34 of determining, based on the usage status of the ports, time-frequency resources corresponding to idle CSI-RS ports of a CSI-RS configuration different from the CSI-RS configuration of the cell itself. Then steps S37 and S38 may be performed. In step S37, it is generated a message containing information on time-frequency resources corresponding to idle CSI-RS ports of a CSI-RS configuration different from the CSI-RS configuration of the cell itself. In step S38, the generated message is transmitted to the base station of the corresponding cell. In addition, in a case that step S34 is not performed, the usage status of the ports determined in step S32 may also be transmitted in step S38.

The above method may further include step S35 of judging, for each cell, whether the determined idle conditions of the CSI-RS ports of the CSI-RS configuration different from the CSI-RS configuration of the cell meets a first predetermined condition. If the first predetermined condition is met (YES), the process proceeds to step S37 of generating the message. If the first predetermined condition is not met (NO), process proceeds to step S36 of judging, for each cell, whether the determined idle conditions of the CSI-RS configuration different from the CSI-RS configuration of the cell meets a second predetermined condition. If the second predetermined condition is met (YES), process proceeds to step S39 of generating a prohibiting message for indicating that the cell is prohibited from using the idle CSI-RS ports to transmit data. If the second predetermined condition is not met (NO), process returns to step S32 to continue updating the usage status of the CSI-RS ports of the adjacent cell. It should be understood that, there may be a case that only the judgment of the first predetermined condition is performed. If the first predetermined condition is not met, the process returns to step S32, or only the judgment of the second predetermined condition is performed.

Note that the above-described methods may be used in combination or separately, and the details of which have been described in detail in the first to eighth embodiments and will not be repeated here.

For ease of understanding, an exemplary information flow between a base station and user equipment will be described below with reference to FIG. 17. The base station may include any one of the electronic devices 100 to 300 or the information processing device 400 described above, and the user equipment may include any one of the electronic device 500 or the information processing device 600 described above. It should be understood that the information flow is for illustrative purposes only and is not intended to be limiting.

Figure 17:
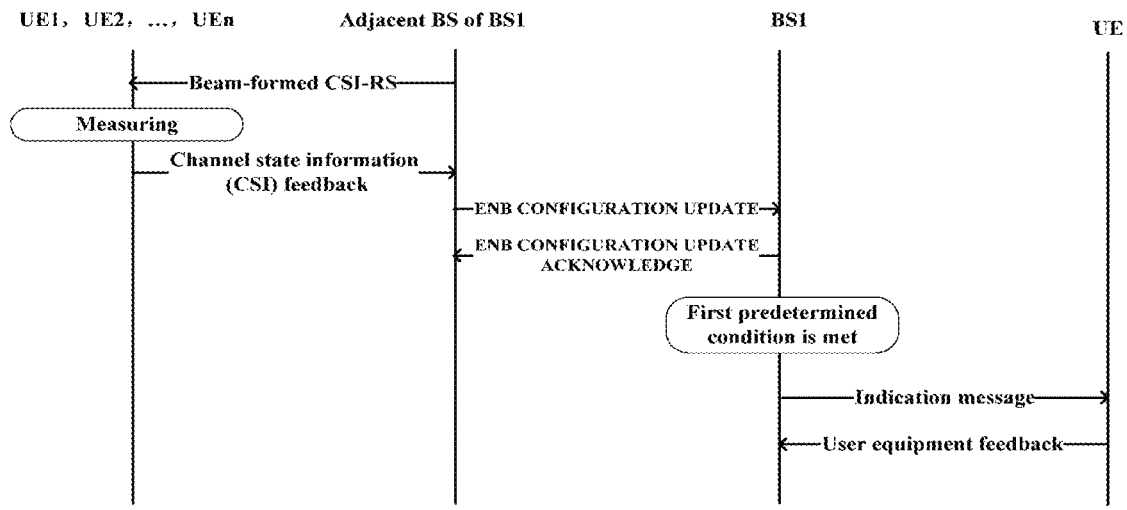
FIG. 17 illustrates an example of an information flow between a base station and a user equipment and between base stations.

FIG. 17 illustrates an example of an information flow between a base station and user equipment (UE) and between base stations. A base station of a cell that is to use idle CSI-RS resources to transmit data is a base station 1, and an adjacent base station of the base station 1 is a base station of a cell located within an interference range of the cell 1. Note that although one adjacent base station is shown in FIG. 17, the number of adjacent base stations is not necessarily one, but may be more, which is only an example here.

In FIG. 17, an adjacent base station transmits a beam-formed CSI-RS to each of user equipment of the adjacent base station. After measuring the beam-formed CSI-RS, the user equipment transmits a CSI feedback to the adjacent base station, so that the adjacent base station can obtain the usage status of the CSI-RS ports. Subsequently, the adjacent base station provides the base station 1 with the usage status of the ports. In FIG. 17, the usage status of the CSI-RS ports is transferred via the X2 signaling ENB CONFIGURATION UPDATE. Specifically, for example, a new information element Antenna ports-usage can be added to the information element Served Cell Information in the ENB CONFIGURATION UPDATE message described above, to carry information on the usage status of the CSI-RS ports, and the information element Antenna ports-usage may, for example, be in the form of a bitmap. After receiving the ENB CONFIGURATION UPDATE, the base station 1 transmits an ENB CONFIGURATION UPDATE ACKNOWLEDGE to the corresponding adjacent base station to confirm receipt of the message.

Next, the base station 1 processes the received usage status of the CSI-RS ports from the adjacent base station(s), for example, to obtain the number of the idle CSI-RS ports of each CSI-RS configuration, and judges whether the idle conditions of the CSI-RS ports meets a first predetermined condition. If the first predetermined condition is met, an indication message Allowed_Reresource indicating an idle CSI-RS resource which can be used by the user equipment of the base station 1 is transmitted to the user equipment of the base station 1. The indication message is equivalent to a message for enabling utilization of the idle CSI-RS resources. Specifically, for the description of the first predetermined condition and the indication message, please refer to the details of the foregoing.

After receiving the indication message, the user equipment of the base station 1 transmits the user equipment feedback Open_close_response to the base station 1 to inform the base station 1 that the user equipment accepts or refuses the enabling indicated by the above-described indication message. For example, when Open_close_response is 1, it indicates that the enabling is accepted; when Open_close_response is 0, it indicates that the enabling is refused.

Figure 18:
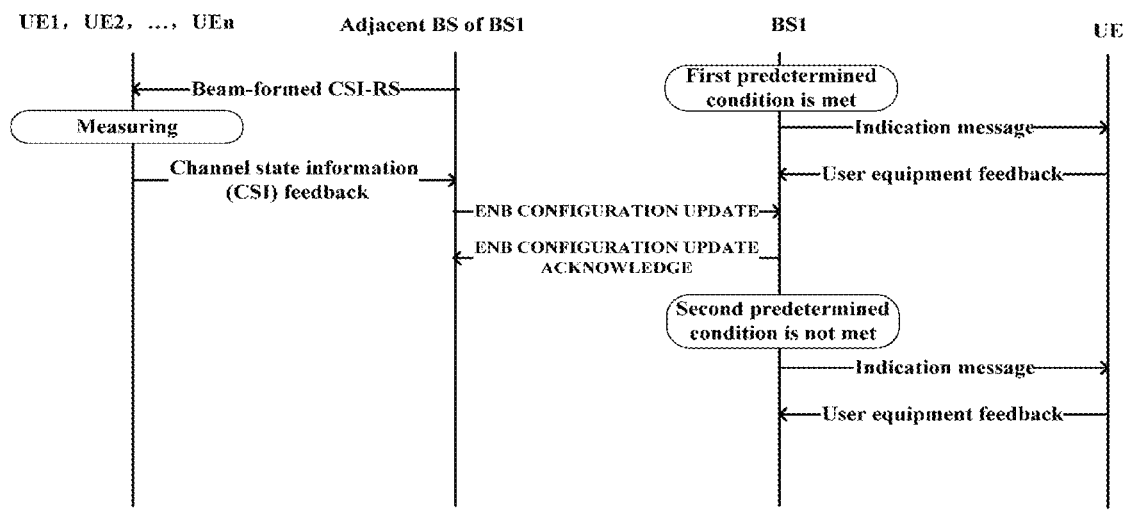
FIG. 18 illustrates another example of an information flow between a base station and a user equipment and between base stations.

FIG. 18 illustrates an example of an information flow between a base station and user equipment (UE) and between base stations during a period in which the base station 1 uses idle CSI-RS resources to transmit data. Compared with FIG. 17, a judgment on whether the idle conditions of the CSI-RS ports from the adjacent base station meets a second predetermined condition is added during the period in which the base station 1 uses the idle CSI-RS resources to transmit data.

FIG. 18 illustrates a case where the second predetermined condition is not met. In this case, an indication message Allowed_Reresource for indicating an idle CSI-RS resource that can be used by the user equipment is provided to the user equipment, so that the user equipment can continue to use the current idle CSI-RS resource to transmit data. Similarly, the user equipment also transmits the user equipment feedback to the base station 1.

Figure 19:
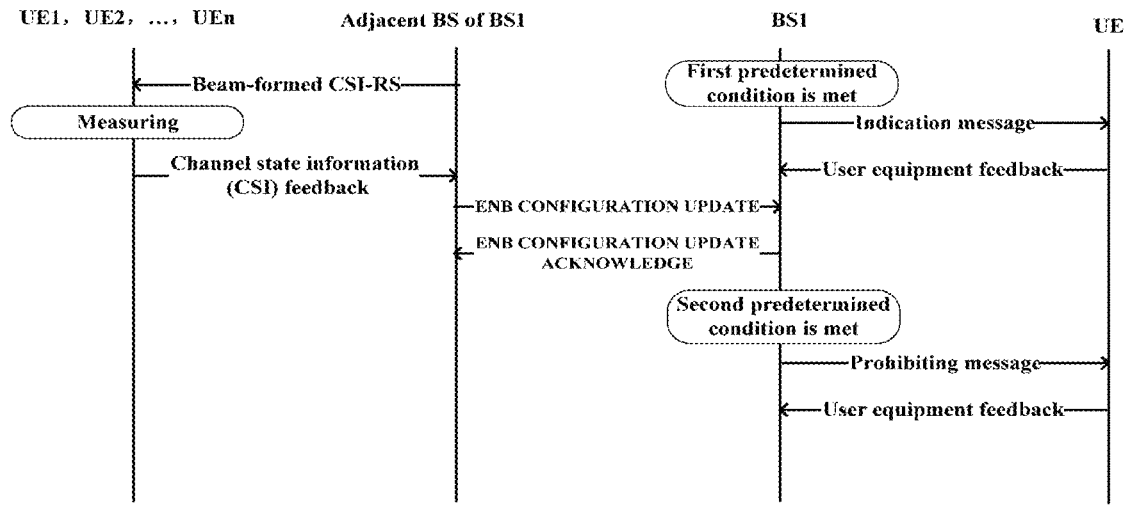
FIG. 19 illustrates another example of an information flow between a base station and a user equipment and between base stations.

FIG. 19 illustrates another example of an information flow between a base station and user equipment (UE) and between base stations during a period in which the base station 1 uses the idle CSI-RS resources to transmit data. In this example, the second predetermined condition is met, and the base station 1 transmits a prohibiting message to the user equipment to prohibit the user equipment from using the idle CSI-RS resources to transmit data. Similarly, the user equipment also transmits the user equipment feedback to the base station 1.

Figure 20:
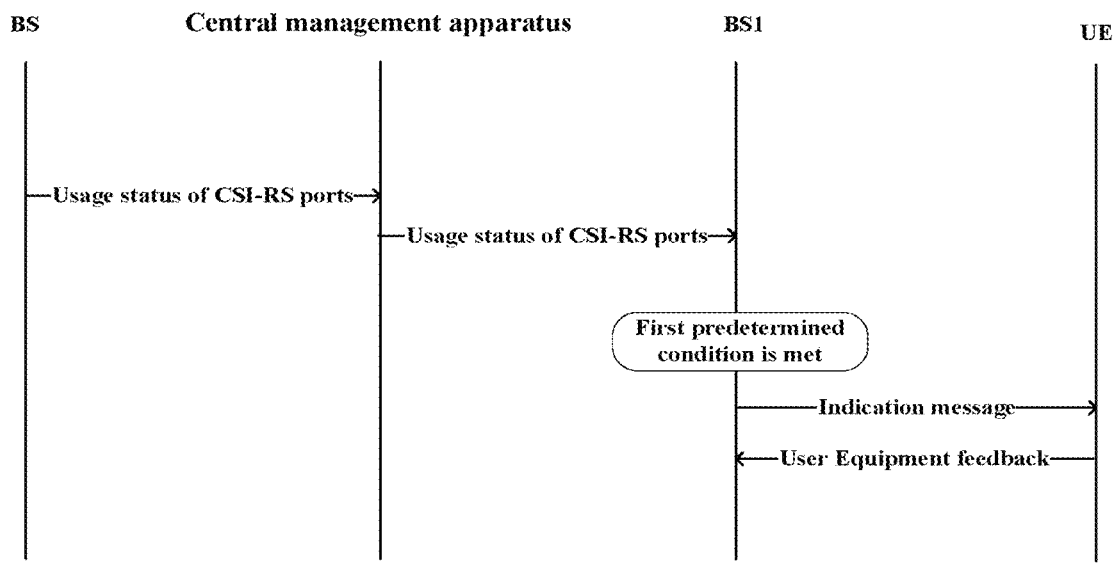
FIG. 20 illustrates an example of an information flow in a case of providing a central management apparatus.
Figure 21:
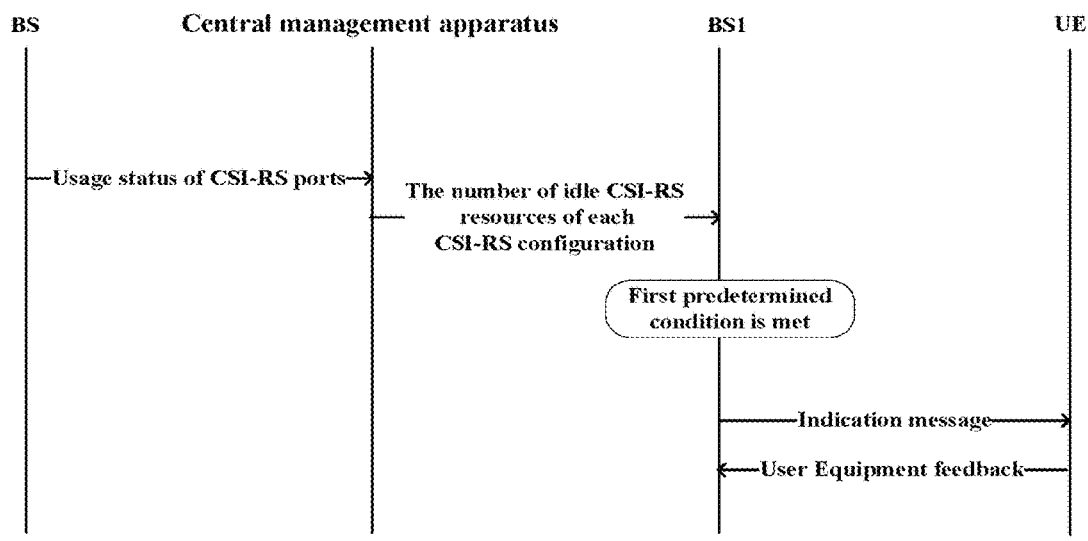
FIG. 21 illustrates another example of an information flow in a case of providing a central management apparatus.
Figure 22:
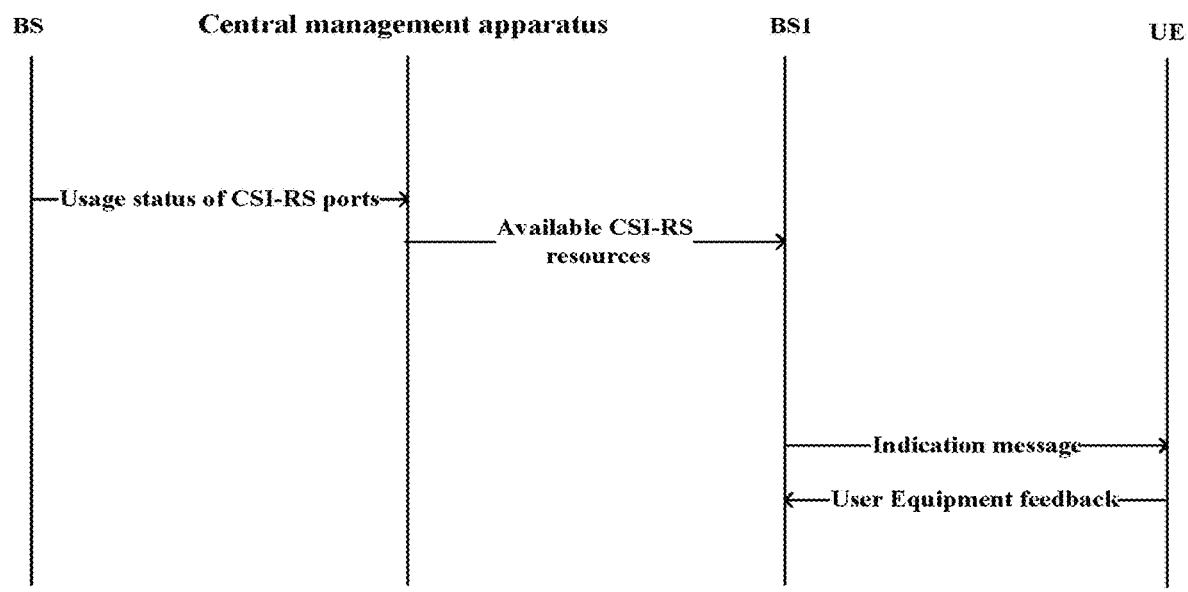
FIG. 22 illustrates another example of an information flow in a case of providing a central management apparatus.

Each of FIGS. 20 to 22 illustrates an example of an information flow of acquiring information on idle CSI-RS resources by a base station via a central management apparatus. It should be noted that the flow between the base station and its user equipment side may be the same as that in FIGS. 17 to 19. Hence, only the same part as in the case of FIG. 17 is illustrated in FIGS. 20 to 22, but the cases of FIGS. 18 and 19 are similarly applicable to the information interaction part between a base station and its user equipment side in FIGS. 20 to 22.

In FIGS. 20 to 22, the left base station represents each base station managed by the central management apparatus, which includes the base station 1. In FIG. 20, the base station 1 acquires the usage status of the CSI-RS ports from the central management apparatus, obtains idle CSI-RS resources of each CSI-RS configuration according to the usage status, and judges whether the first predetermined condition is met. In the case that the first predetermined condition is met, the user equipment is instructed to use the idle CSI-RS resources to transmit data.

In FIG. 21, the usage status of the CSI-RS ports is further processed by the central management apparatus to obtain idle CSI-RS resources of each CSI-RS configuration, and the related information is provided to the base station 1. The base station 1 judges whether the first predetermined condition is met. In the case that the first predetermined condition is met, the user equipment is instructed to use the idle CSI-RS resources to transmit data.

In FIG. 22, the central management apparatus performs further processing on the idle CSI-RS resources of each CSI-RS configuration, for example, judging whether the first predetermined condition is met, and the central management apparatus obtains idle CSI-RS resources which can be used by the base station 1 and provides them to the base station 1. In this case, the base station 1 does not need to perform any further processing, and may directly instruct the user equipment to use these CSI-RS resources to transmit data.

In addition, the description about the present technology is similarly applicable to the case of using Cell-Specific beam-formed CSI-RS, UE-Specific beam-formed CSI-RS, non-periodic beam-formed CSI-RS, or any combination thereof.

Application Example

The technology of the present disclosure can be applied to various products. For example, the electronic device 700 may be implemented as any type of server, such as a tower server, a rack server, and a blade server. The electronic device 700 may be a control module mounted on a server (such as an integrated circuit module including a single wafer, and a card or a blade inserted into a slot of the blade server).

In addition, the base station mentioned in the present disclosure may be implemented as any type of an evolved node B (eNB), such as a macro eNB and a small eNB. The small eNB may be an eNB which covers a cell smaller than a macro cell, such as a pico eNB, a micro eNB and a home (femto) eNB. Alternatively, the base station may be implemented as any other type of a base station, such as a Node B and a base transceiver station (BTS). The base station may include: a main body (also referred to as a base station device) configured to control the wireless communications, and one or more remote radio header (RRH) provided at a different site from the main body. Further, various types of user equipment may function as a base station by performing the function of the base station temporarily or semi-permanently.

Application Example Regarding a Base Station

First Application Example

Figure 23:
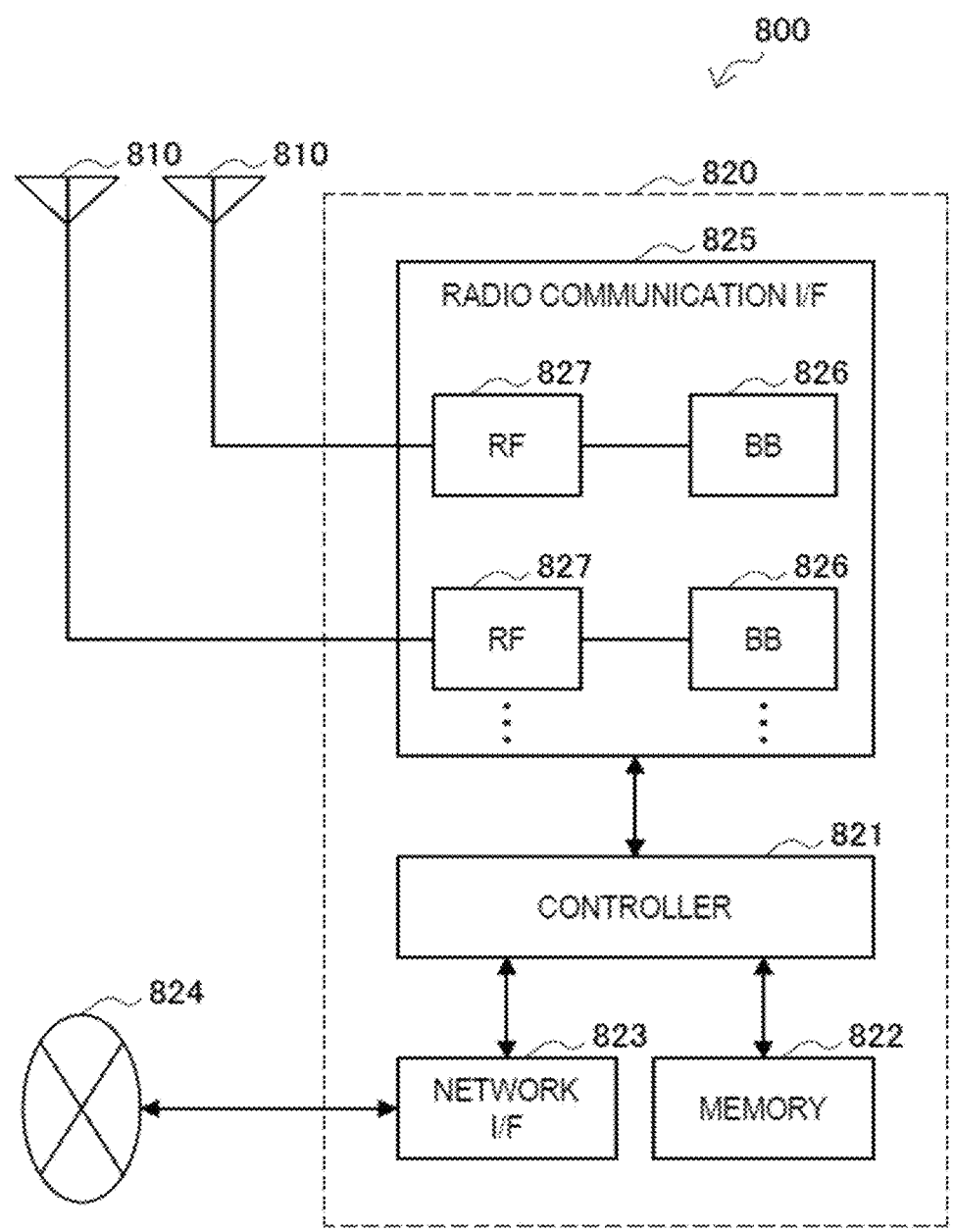
FIG. 23 is a block diagram illustrating a first example of a schematic configuration of an evolved Node B (eNB) to which the technology according to the present disclosure is applicable.

FIG. 23 is a block diagram illustrating a first example of a schematic configuration of an eNB to which the technology according to the present disclosure is applicable. An eNB 800 includes one or more antennas 810 and a base station device 820. The base station device 820 and each antenna 810 may be connected with each other via RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RANI and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 23. For example, the multiple BB processors 826 may be compatible with multiple frequency bands used by the eNB 800. The radio communication interface 825 may include the multiple RF circuits 827, as illustrated in FIG. 23. For example, the multiple RF circuits 827 may be compatible with multiple antenna elements. Although FIG. 23 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 23, the transceiving unit 401 described with reference to FIG. 10 may be implemented by the wireless communication interface 825. At least a part of the functions may also be implemented by the controller 821. For example, the controller 821 may execute determining and informing for an idle CSI-RS resource which can be used to transmit data by executing the functions of the allowing units 101 and 403, the determining units 102 and 402, the judging units 201 and 404, and the message generating unit 301.

Second Application Example

Figure 24:
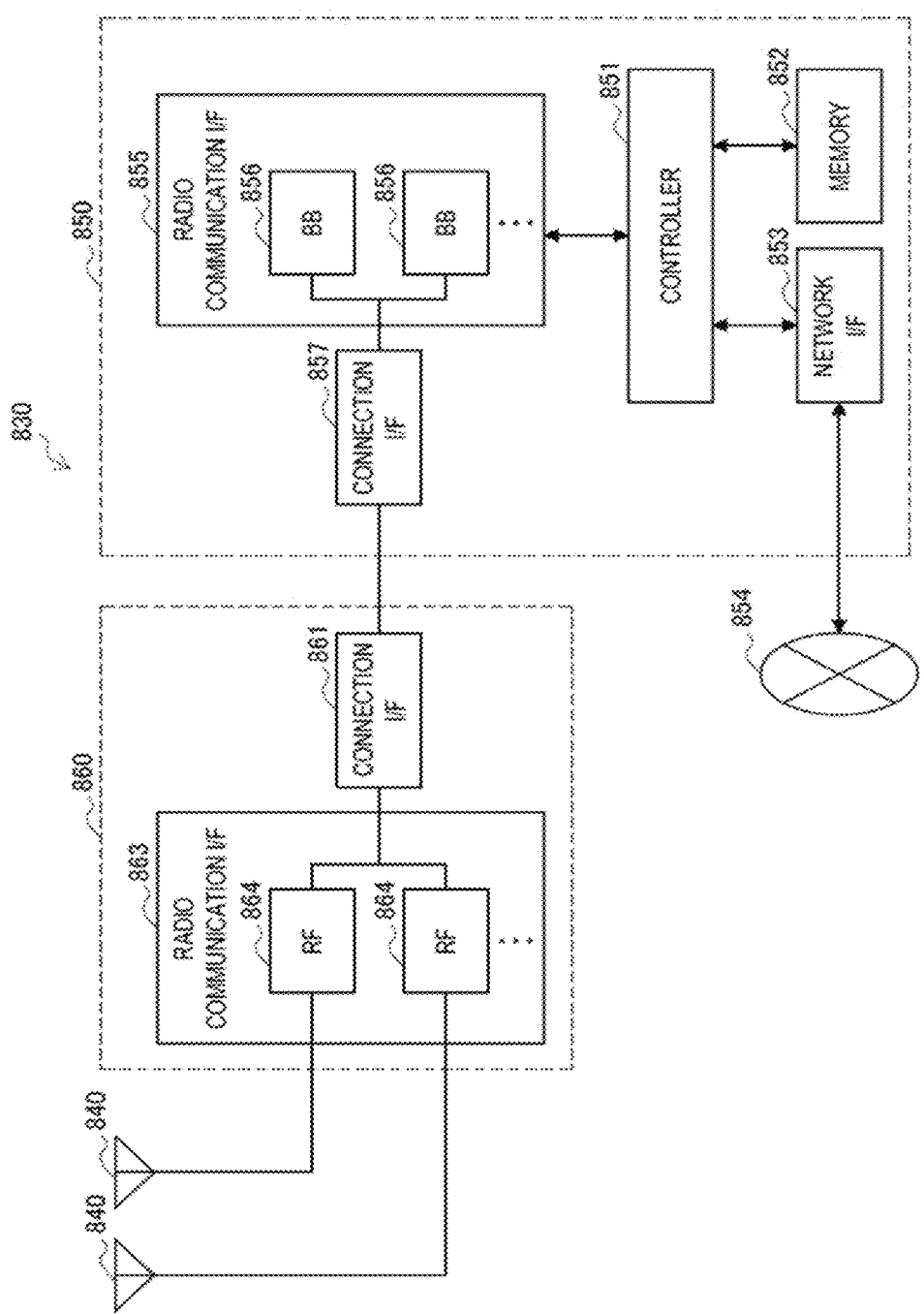
FIG. 24 is a block diagram illustrating a second example of a schematic configuration of an eNB to which the technology according to the present disclosure is applicable.

FIG. 24 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 24.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 24, except the BB processor 856 is connected to the RF circuit 864 of the RRH 860 via the connection interface 857. The radio communication interface 855 may include the multiple BB processors 856, as illustrated in FIG. 24. For example, the multiple BB processors 856 may be compatible with multiple frequency bands used by the eNB 830. Although FIG. 24 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 24. For example, the multiple RF circuits 864 may support multiple antenna elements. Although FIG. 24 illustrates the example in which the radio communication interface 863 includes the multiple RF circuits 864, the radio communication interface 863 may also include a single RF circuit 864.

In the eNB 800 illustrated in FIG. 24, the transceiving unit 401 described with reference to FIG. 10 may be implemented by the wireless communication interface 855 and/or the wireless communication interface 863. At least a part of the functions may also be implemented by the controller 851. For example, the controller 851 may execute determining and informing for an idle CSI-RS resource which can be used to transmit data by executing the functions of the allowing units 101 and 403, the determining units 102 and 402, the judging units 201 and 404, and the message generating unit 301.

Application Example Regarding a User Equipment

First Application Example

Figure 25:
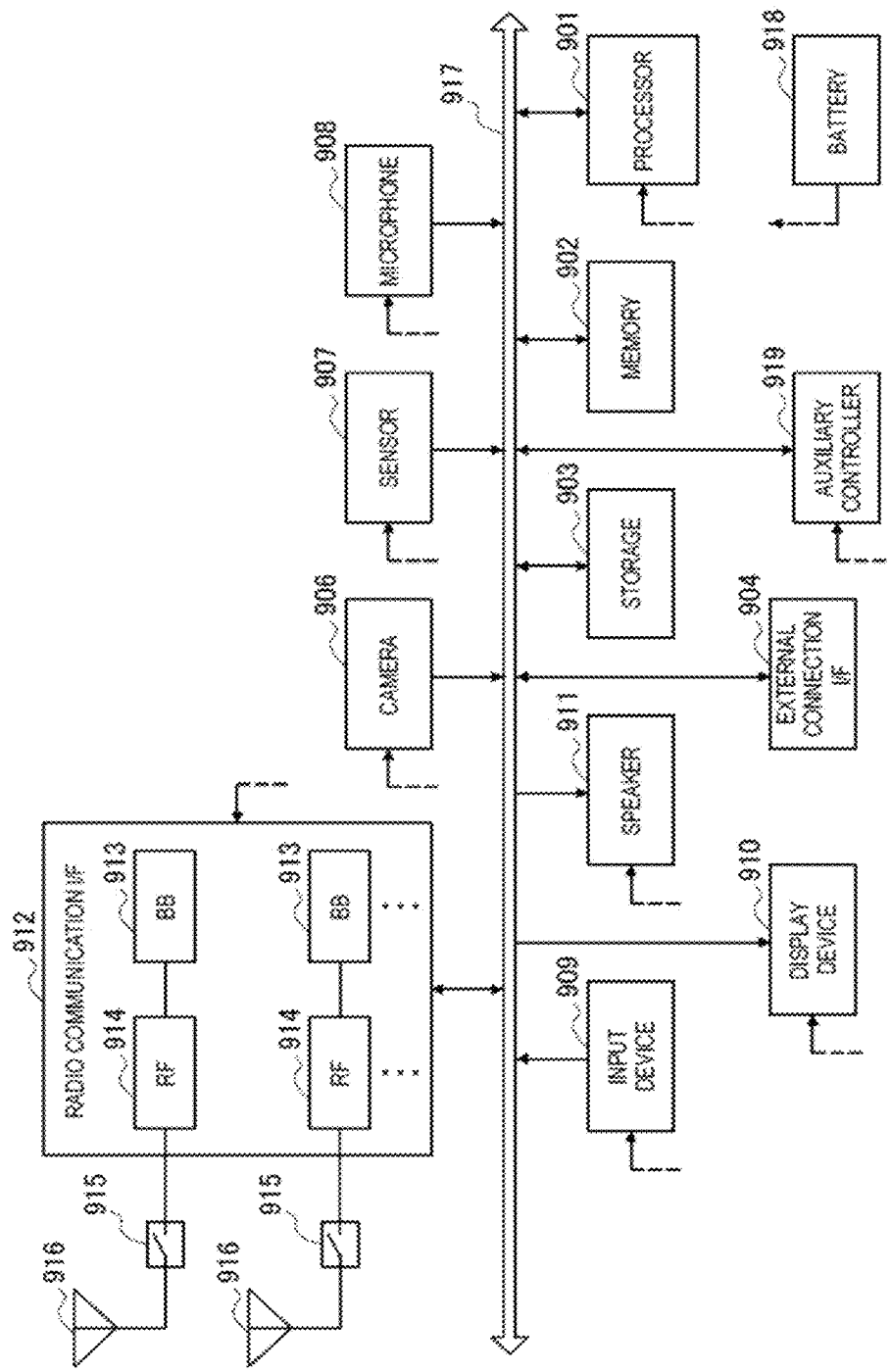
FIG. 25 is a block diagram illustrating an example of a schematic configuration of a smartphone to which the technology according to the present disclosure is applicable.

FIG. 25 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LET and LTE- Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 25. Although FIG. 25 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 25. Although FIG. 25 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 25 via feeder lines, which are partially shown as dashed lines in the figure. The auxiliary controller 919 operates a minimum necessary function of the smartphone 900, for example, in a sleep mode.

In the smartphone 900 illustrated in FIG. 25, the transceiving unit 601 described with reference to FIG. 12 may be implemented by the wireless communication interface 912. At least a part of the functions may also be implemented by the processor 901 or the auxiliary controller 919. For example, the processor 901 or the auxiliary controller 919 may implement or prohibit the data transmission using an idle CSI-RS resource by executing the functions of the determining unit 501 or 602, the feedback generating unit 502 or 603.

Second Application Example

Figure 26:
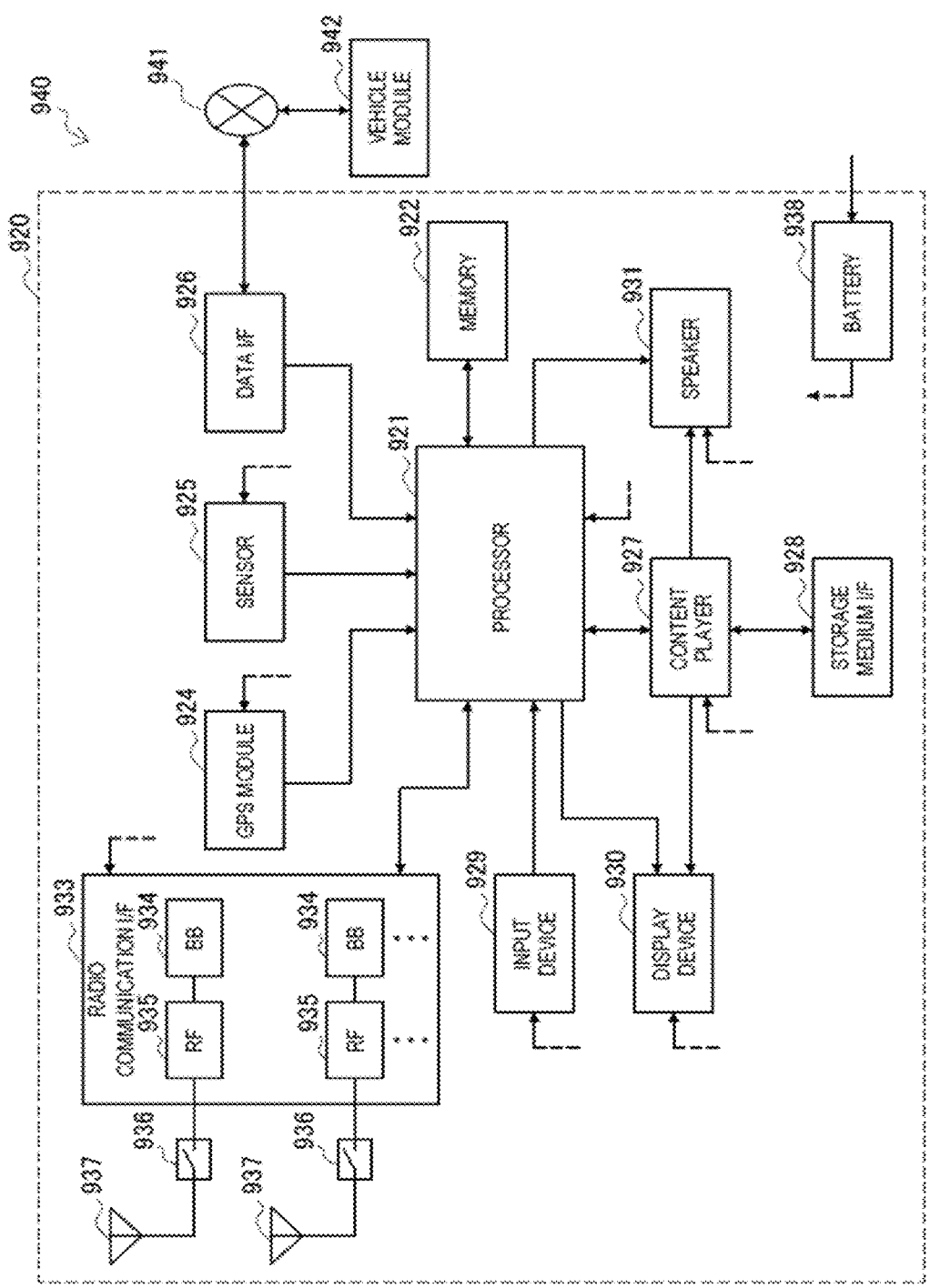
FIG. 26 is a block diagram illustrating an example of a schematic configuration of a car navigation device to which the technology according to the present disclosure is applicable.

FIG. 26 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 26. Although FIG. 26 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 26. Although FIG. 26 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 26 via feeder lines that are partially shown as dashed lines in the figure. The battery 938 accumulates power supplied from the vehicle.

In the car navigation device 920 illustrated in FIG. 26, the transceiving unit 601 described with reference to FIG. 12 may be implemented by the wireless communication interface 933. At least a part of the functions may also be implemented by the processor 921. For example, the processor 921 may implement or prohibit the data transmission using an idle CSI-RS resource by executing the functions of the determining unit 501 or 602, the feedback generating unit 502 or 603.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2700 shown in FIG. 27) from a storage medium or network, wherein the computer is capable of implementing various functions when installed with various programs.

Figure 27:
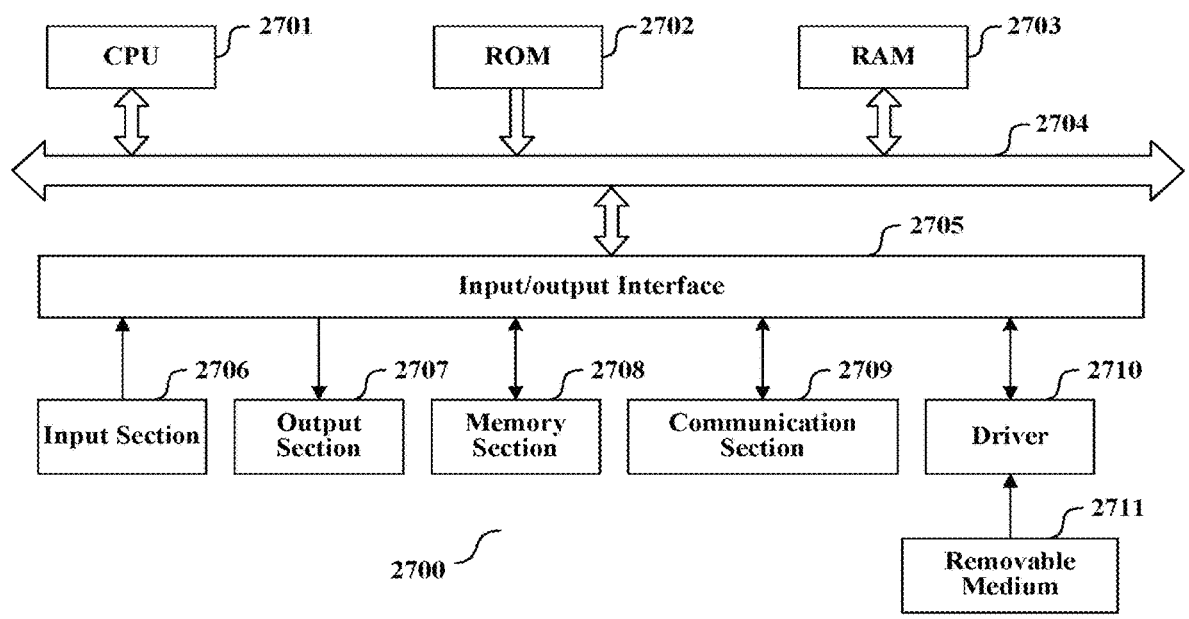
FIG. 27 is a block diagram of an exemplary block diagram illustrating the structure of a general purpose personal computer capable of realizing the method and/or device and/or system according to the embodiments of the present invention.

In FIG. 27, a central processing unit (CPU) 2701 executes various processing according to a program stored in a read-only memory (ROM) 2702 or a program loaded to a random access memory (RAM) 2703 from a memory section 2708. The data needed for the various processing of the CPU 2701 may be stored in the RAM 2703 as needed. The CPU 2701, the ROM 2702 and the RAM 2703 are linked with each other via a bus 2704. An input/output interface 2705 is also linked to the bus 2704.

The following components are linked to the input/output interface 2705: an input section 2706 (including keyboard, mouse and the like), an output section 2707 (including displays such as a cathode ray tube (CRT), a liquid crystal display (LCD), a loudspeaker and the like), a memory section 2708 (including hard disc and the like), and a communication section 2709 (including a network interface card such as a LAN card, modem and the like). The communication section 2709 performs communication processing via a network such as the Internet. A driver 2710 may also be linked to the input/output interface 2705. If needed, a removable medium 2711, for example, a magnetic disc, an optical disc, a magnetic optical disc, a semiconductor memory and the like, may be installed in the driver 2710, so that the computer program read therefrom is installed in the memory section 2708 as appropriate.

In the case where the foregoing series of processing is achieved by software, programs forming the software are installed from a network such as the Internet or a memory medium such as the removable medium 2711.

It should be appreciated by those skilled in the art that the memory medium is not limited to the removable medium 2711 shown in FIG. 27, which has program stored therein and is distributed separately from the apparatus so as to provide the programs to users. The removable medium 2711 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2702 and the memory section 2708 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An electronic device operating in a first cell in accordance with a first channel state information-reference signal (CSI-RS) configuration, comprising:
   processing circuitry, configured to:
      determine a usage status of CSI-RS ports of at least one cell adjacent to the first cell;
      determine, based on the usage status, time-frequency resources corresponding to one or more idle CSI-RS ports of a CSI-RS configuration of the at least one cell adjacent to the first cell, the CSI-RS configuration of the at least one cell adjacent to the first cell being different from the first CSI-RS configuration; and
      enable the first cell to use at least a portion of the time-frequency resources corresponding to the one or more idle CSI-RS ports of the CSI-RS configuration of the at least one cell adjacent to the first cell,
   wherein the processing circuitry is further configured to enable the first cell to use at least the portion of the time-frequency resources corresponding to the one or more idle CSI-RS ports of the CSI-RS configuration of the at least one cell adjacent to the first cell when a first predetermined condition is met,
   wherein the first predetermined condition is that a total number of time-frequency resources of the portion of the time-frequency resources corresponding to the one or more idle CSI-RS ports of the CSI-RS configuration of the at least one cell adjacent to the first cell is greater than a first predetermined threshold,
   wherein the first predetermined threshold is set based on at least one of an overhead of signaling bits, a data throughput increase to be obtained by using at least the portion of the time-frequency resources corresponding to the one or more idle CSI-RS ports of the CSI-RS configuration of the at least one cell adjacent to the first cell, or an expected maximum increase in the data throughput to be obtained by using at least the portion of the time-frequency resources corresponding to the one or more idle CSI-RS ports of the CSI-RS configuration of the at least one cell adjacent to the first cell.

2. The electronic device according to claim 1,
   wherein the processing circuitry is further configured to enable the first cell to use at least the portion of the time-frequency resources corresponding to the one or more idle CSI-RS ports of the CSI-RS configuration of the at least one cell adjacent to the first cell when the first predetermined condition is met and when a second predetermined condition is not met,
   wherein the second predetermined condition is that the total number of time-frequency resources of the portion of the time-frequency resources corresponding to the one or more idle CSI-RS ports of the CSI-RS configuration of the at least one cell adjacent to the first cell is less than a second predetermined threshold less than the first predetermined threshold,
   wherein the second predetermined threshold is set based on at least one of the overhead of signaling bits, the data throughput increase to be obtained by using at least the portion of the time-frequency resources corresponding to the one or more idle CSI-RS ports of the CSI-RS configuration of the at least one cell adjacent to the first cell, or the expected maximum increase in the data throughput to be obtained by using at least the portion of the time-frequency resources corresponding to the one or more idle CSI-RS ports of the CSI-RS configuration of the at least one cell adjacent to the first cell.

3. The electronic device according to claim 2, wherein the processing circuitry is further configured to generate a prohibiting message for indicating to a user equipment of the first cell that the second predetermined condition is met.

4. The electronic device according to claim 1, wherein the processing circuitry is further configured to:
   subsequent to enabling the first cell to use at least the portion of the time-frequency resources corresponding to the one or more idle CSI-RS ports of the CSI-RS configuration of the at least one cell adjacent to the first cell, prohibit the first cell from continuing to use at least the portion of the time-frequency resources corresponding to the one or more idle CSI-RS ports of the CSI-RS configuration of the at least one cell adjacent to the first cell when a second predetermined condition is subsequently met,
   wherein the second predetermined condition is that the total number of time-frequency resources of portion of the time-frequency resources corresponding to the one or more idle CSI-RS ports of the CSI-RS configuration of the at least one cell adjacent to the first cell is less than a second predetermined threshold less than the first predetermined threshold,
   wherein the second predetermined threshold is set based on at least one of the overhead of signaling bits, the data throughput increase to be obtained by using at least the portion of the time-frequency resources corresponding to the one or more idle CSI-RS ports of the CSI-RS configuration of the at least one cell adjacent to the first cell, or the expected maximum increase in the data throughput to be obtained by using at least the portion of the time-frequency resources corresponding to the one or more idle CSI-RS ports of the CSI-RS configuration of the at least one cell adjacent to the first cell.

5. The electronic device according to claim 4, wherein the processing circuitry is further configured to:
   periodically update the determined usage status during a period in which the first cell uses the portion of the time-frequency resources corresponding to the one or more idle CSI-RS ports of the CSI-RS configuration of the at least one cell adjacent to the first cell; and
   periodically update the first cell about the portion of the time-frequency resources corresponding to the one or more idle CSI-RS ports of the CSI-RS configuration of the at least one cell adjacent to the first cell that may be used by the first cell.

6. The electronic device according to claim 1,
   wherein the at least one cell adjacent to the first cell comprises the at least two cells adjacent to the first cell, and
   wherein the portion of the time-frequency resources used by the first cell are drawn from one adjacent cell of the at least two cells with a fewest number of idle CSI-RS ports.

7. The electronic device according to claim 1, wherein the processing circuitry is further configured to:
   generate an indication message for indicating, to a user equipment of the first cell, the portion of the time-frequency resources corresponding to the one or more idle CSI-RS ports of the CSI-RS configuration of the at least one cell adjacent to the first cell.

8. The electronic device according to claim 7, wherein the indication message comprises information on a number of time-frequency resources of the portion of the time-frequency resources corresponding to the one or more idle CSI-RS ports of the CSI-RS configuration of the at least one cell adjacent to the first cell.

9. A method performed by an electronic device operating in a first cell in accordance with a first channel state information-reference signal (CSI-RS) configuration, the method comprising:
- determining a usage status of CSI-RS ports of at least one cell adjacent to the first cell;
- determining, based on the usage status, time-frequency resources corresponding to one or more idle CSI-RS ports of a CSI-RS configuration of the at least one cell adjacent to the first cell, the CSI-RS configuration of the at least one cell adjacent to the first cell being different from the first CSI-RS configuration; and
- enabling the first cell to use at least a portion of the time-frequency resources corresponding to the one or more idle CSI-RS ports of the CSI-RS configuration of the at least one cell adjacent to the first cell,
- wherein the enabling comprises enabling the first cell to use at least the portion of the time-frequency resources corresponding to the one or more idle CSI-RS ports of the CSI-RS configuration of the at least one cell adjacent to the first cell when a first predetermined condition is met,
- wherein the first predetermined condition is that a total number of time-frequency resources of the portion of the time-frequency resources corresponding to the one or more idle CSI-RS ports of the CSI-RS configuration of the at least one cell adjacent to the first cell is greater than a first predetermined threshold,
- wherein the first predetermined threshold is set based on at least one of an overhead of signaling bits, a data throughput increase to be obtained by using at least the portion of the time-frequency resources corresponding to the one or more idle CSI-RS ports of the CSI-RS configuration of the at least one cell adjacent to the first cell, or an expected maximum increase in the data throughput to be obtained by using at least the portion of the time-frequency resources corresponding to the one or more idle CSI-RS ports of the CSI-RS configuration of the at least one cell adjacent to the first cell.

* * * * *